(12) United States Patent
Lee

(10) Patent No.: US 7,363,065 B2
(45) Date of Patent: Apr. 22, 2008

(54) AUTOMATIC SLIDING-TYPE MOBILE COMMUNICATION TERMINAL, METHOD OF AUTOMATICALLY DRIVING SLIDING-TYPE MOBILE COMMUNICATION TERMINAL, AND METHOD OF DETECTING INCOMING CALL TO SLIDING-TYPE MOBILE COMMUNICATION TERMINAL

(75) Inventor: Ki Young Lee, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 260 days.

(21) Appl. No.: 10/862,352

(22) Filed: Jun. 8, 2004

(65) Prior Publication Data

US 2005/0272487 A1 Dec. 8, 2005

(30) Foreign Application Priority Data

Apr. 30, 2004 (KR) ...................... 10-2004-0030578

(51) Int. Cl.
*H04M 1/00* (2006.01)

(52) U.S. Cl. ................... 455/575.3; 455/575.1; 455/575.4; 455/90.3; 455/414.1; D14/138; D14/140

(58) Field of Classification Search ............. 455/575.4, 455/550.1, 90.3, 575.1, 575.3, 414.1, 414.2, 455/415, 418; D14/138, 140
See application file for complete search history.

(56) References Cited

U.S. PATENT DOCUMENTS

| | | | |
|---|---|---|---|
| 6,782,242 B1 * | 8/2004 | Koleda et al. ............. | 455/90.3 |
| 6,822,871 B2 * | 11/2004 | Lee et al. ................... | 361/727 |
| 6,980,840 B2 * | 12/2005 | Kim et al. ................ | 455/575.4 |
| 7,136,688 B2 * | 11/2006 | Jung et al. ................ | 455/575.4 |
| 2003/0003962 A1 | 1/2003 | Vooi-Kia et al. | |
| 2003/0211874 A1 * | 11/2003 | Mizuta et al. ........... | 455/575.4 |
| 2005/0009582 A1 * | 1/2005 | Vooi-Kia et al. ......... | 455/575.4 |

FOREIGN PATENT DOCUMENTS

| | | |
|---|---|---|
| DE | 103 48 000 A1 | 10/2004 |
| EP | 0 414 365 A2 | 2/1991 |
| EP | 1 075 125 | 2/2001 |
| EP | 1 075 125 A2 | 2/2001 |
| EP | 1 148 692 | 10/2001 |
| EP | 1 150 476 A2 | 10/2001 |

(Continued)

OTHER PUBLICATIONS

German Patent Office, Office Action mailed Nov. 10, 2006 and English Translation.

*Primary Examiner*—Charles N. Appiah
*Assistant Examiner*—Olumide Ajibade-Akonai
(74) *Attorney, Agent, or Firm*—Lowe Hauptman Ham & Berner

(57) ABSTRACT

An automatic sliding-type mobile communication terminal comprising a motor, a pair of engaging members, which are selectively engageable with each other, and position detecting means so that a first terminal body and a second terminal body are smoothly slid relative to each other in an automatic/semi-automatic mode or an automatic/manual mode, a method of automatically driving an automatic sliding-type mobile communication terminal, and a method of detecting an incoming call to an automatic sliding-type mobile communication terminal.

24 Claims, 12 Drawing Sheets

FOREIGN PATENT DOCUMENTS

| | | |
|---|---|---|
| EP | 1 182 849 A1 | 2/2002 |
| EP | 1 422 913 | 5/2004 |
| GB | 2 350 516 A | 11/2000 |
| JP | 64-35595 | 3/1989 |
| JP | 2000-183619 | 6/2000 |
| JP | 2001-060996 | 3/2001 |
| JP | 2001-127855 | 5/2001 |
| JP | 2002-44208 | 2/2002 |
| JP | 2002-061456 | 2/2002 |
| JP | 2002-281116 | 9/2002 |
| JP | 2004-103676 | 4/2004 |

\* cited by examiner

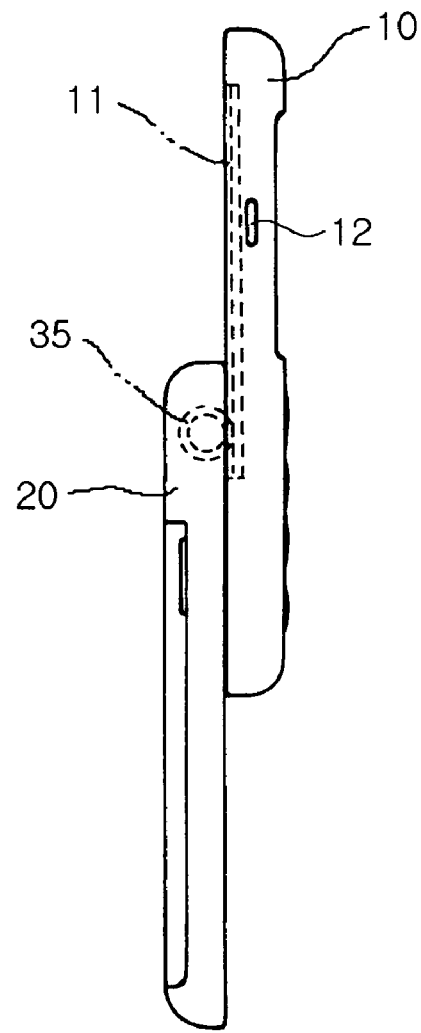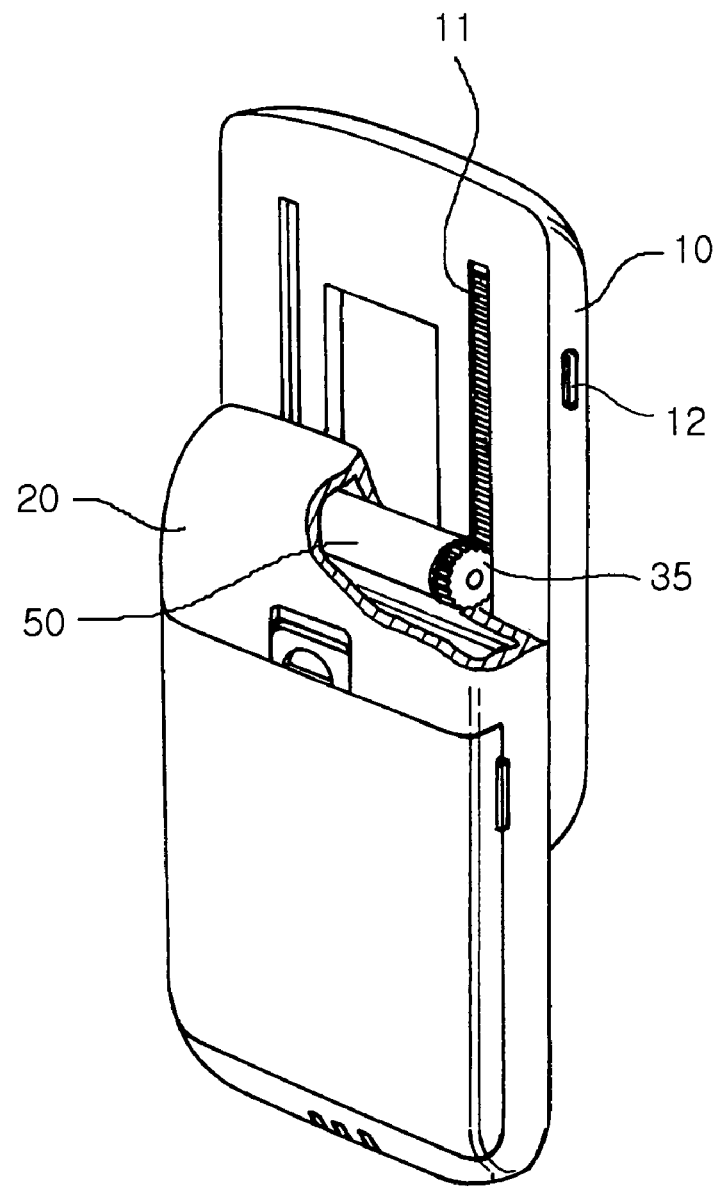
FIG. 3a
FIG. 3b

AUTOMATIC SLIDING-TYPE MOBILE COMMUNICATION TERMINAL, METHOD OF AUTOMATICALLY DRIVING SLIDING-TYPE MOBILE COMMUNICATION TERMINAL, AND METHOD OF DETECTING INCOMING CALL TO SLIDING-TYPE MOBILE COMMUNICATION TERMINAL

BACKGROUND OF THE INVENTION

1. Field of the Invention

The present invention relates generally to an automatic sliding-type mobile communication terminal, and more particularly to an automatic sliding-type mobile communication terminal comprising a motor, a pair of engaging members, which are selectively engageable with each other, and position detecting means so that a first terminal body and a second terminal body are smoothly slid relative to each other in an automatic/semi-automatic mode or an automatic/manual mode. The present invention also relates to a method of automatically driving such an automatic sliding-type mobile communication terminal, and to a method of detecting an incoming call to such an automatic sliding-type mobile communication terminal.

2. Description of the Related Art

Generally, a sliding-type mobile communication terminal has an upper terminal body and a lower terminal body. The upper terminal body and the lower terminal body are slid relative to each other while the upper terminal body is laid on the top of the lower terminal body so that the lower terminal body is exposed or covered.

A conventional sliding-type mobile communication terminal comprises a slide module including guides securely fixed to one side of the terminal for guiding a sliding movement, and sliders that perform a reciprocating sliding movement along the guides. The sliders are securely fixed to the other side of the terminal, which is opposite to the side of the terminal where the guides are securely fixed.

When the guides are provided at the rear part of the upper terminal body, for example, the sliders are attached to the front part of the lower terminal body in such a manner that the guides correspond to the sliders, whereby the sliders can perform a reciprocating sliding movement along the guides.

FIG. 1 is a rear view schematically showing a conventional sliding-type mobile communication terminal.

As shown in FIG. 1, the conventional sliding-type mobile communication terminal comprises an upper terminal body 110 having a display unit (not shown) at the front part thereof, and a lower terminal body 120 having a battery pack 121 attached to the rear part thereof. The upper terminal body 110 and the lower terminal body 120 are slid relative to each other while the upper terminal body 110 is laid on the top of the lower terminal body 120 so that the lower terminal body 120 is exposed or covered. At the rear part of the upper terminal body 110 are formed guide slits 111, in which guides (not shown) for guiding a sliding movement are disposed, respectively. At one side of the front part of the upper terminal body 120 are attached sliders, which perform a reciprocating sliding movement along the guides, respectively. Consequently, the sliders can be slid along with the lower terminal body 120.

Between the guides and the sliders are disposed resilient means, such as coil springs or other suitable springs, which provide a restoring force in the direction of opening the mobile communication terminal while the mobile communication terminal is closed so that the mobile communication terminal can be semi-automatically opened when the mobile communication terminal is opened.

However, the conventional sliding-type mobile communication terminal with the above-mentioned slide module has a drawback in that the sliding-type mobile communication terminal is not easily opened/closed as compared to a folder-type mobile communication terminal, and the mobile communication terminal is not easily opened/closed with one hand.

Therefore, an automatic sliding-type mobile communication terminal that eliminates the above-mentioned drawback has been increasingly requested in the art to which the present invention pertains.

Such a sliding-type mobile communication terminal that is capable of automatically performing an opening/closing operation of the mobile communication terminal is shown in FIG. 2.

As shown in FIG. 2, the sliding-type mobile communication terminal comprises a pinion gear 131 attached to one end of a second terminal body 120', a rack 111' attached to one side of a first terminal body 110' in the longitudinal direction of the first terminal body 110' such that the rack 111' is engaged with the pinion gear 131, a driving motor 133 securely fixed to the second terminal body 120' for providing a driving force, a worm 132 for transmitting the driving force from the driving motor to the pinion gear 131, and a control switch for controlling operation of the driving motor 133.

In the sliding-type mobile communication terminal as described above, the driving motor 133 is operated through a user's manipulation of the control switch while the second terminal body 120' is covered. As the driving motor 133 is operated, the rotating force of the driving motor 133 is transmitted to the pinion gear 131 via the worm gear 132. As a result, the pinion gear 131 is rotated, and therefore the rack 111' engaged with the pinion gear 131 is moved. Consequently, the first terminal body 110' is moved upward so that the first terminal body 110' is opened.

The operation of the driving motor 133 is stopped after the driving motor 133 is operated for a prescribed period of time so that separation of the first terminal body 110' from the second terminal body 120' is prevented. However, the above-mentioned sliding-type mobile communication terminal has a drawback in that the first terminal body does not reach a prescribed position where the first terminal body is fully opened or closed as the output characteristic of the driving motor 133, i.e., revolutions per minute (rpm) is changed.

In order to solve the above-mentioned problem, there is needed position detecting means for detecting relative position between the first terminal body and the second terminal body, whereby the first terminal body reaches a prescribed position where the first terminal body is fully opened or closed.

When the second terminal body is not fully opened since an external force is applied to the second terminal body, current is continuously supplied to the motor with the result that the battery is quickly consumed. Also, an excessive load is applied to a driving system of the mobile communication terminal, which may result in breakdown of the mobile communication terminal. Furthermore, the above-mentioned sliding-type mobile communication terminal is capable of only a full opening/closing operation. As a result, the mobile communication terminal has only limited functions, and thus the use of the mobile communication terminal is very inconvenient.

Besides, when a user usually answers the telephone using the mobile communication terminal, the user may perceive an incoming call to the mobile communication terminal through the use of three types of sense information, i.e., bell (auditory sense), vibration (tactile sense), and light (the sense of sight). The auditory sense, the tactile sense, and the sense of sight may be freely selected according to convenience of the user.

Especially, it is necessary to use a vibration motor in order to detect the incoming call to the mobile communication terminal though the vibration. The vibration motor includes an eccentric rotor, which is eccentrically rotated. The eccentric rotation of the eccentric rotor generates vibration, by which the user can perceive the incoming call to the mobile communication terminal. At present, the incoming call to the mobile communication terminal can be detected only by means of the vibration motor in addition to the incoming call detecting systems using the bell or the LED light.

The installation area of the vibration motor, where the vibration motor used to detect the incoming call through vibration is mounted, is increasingly decreased due to other complex parts of the mobile communication terminal. The miniaturization of the mobile communication terminal is limited by the vibration motor and the complex parts.

Consequently, a new method for detecting an incoming call to the mobile communication terminal without using the vibration motor is under development. If the incoming call to the mobile communication terminal can be detected without the vibration motor, the size of the mobile communication terminal can be decreased. Also, the cost necessary to install the vibration motor may be reduced, and the assembly process of the mobile communication terminal can be simply carried out.

Studies for the new incoming call detecting method using an automatic driving system of the mobile communication terminal without using the vibration motor, which the present invention provides, have been continuously made in the art to which the present invention pertains.

SUMMARY OF THE INVENTION

Therefore, the present invention has been made in view of the above problems, and it is an object of the present invention to provide an automatic sliding-type mobile communication terminal comprising a motor, a pair of engaging members, which are selectively engageable with each other, and position detecting means so that a first terminal body and a second terminal body are smoothly slid relative to each other in an automatic/semi-automatic mode or an automatic/manual mode, whereby the automatic sliding-type mobile communication terminal is more easily and smoothly opened/closed.

It is another object of the present invention to accomplish a full opening/closing operation of the automatic sliding-type mobile communication terminal using the position detecting means.

It is another object of the present invention to provide a device for returning the automatic sliding-type mobile communication terminal to its original position when the mobile communication terminal is not fully opened/closed since an external force is applied to the mobile communication terminal.

It is another object of the present invention to provide a method of automatically driving the automatic sliding-type mobile communication terminal to its original position when the mobile communication terminal is not fully opened/closed since an external force is applied to the mobile communication terminal.

It is yet another object of the present invention to provide a method of detecting an incoming call to the automatic sliding-type mobile communication terminal through the movement of the terminal body of the mobile communication terminal without using the vibration motor, whereby detection efficiency of the incoming call to the mobile communication terminal is improved, the automatic sliding-type mobile communication terminal is miniaturized, and the cost of the automatic sliding-type mobile communication terminal is reduced.

In accordance with one aspect of the present invention, the above and other objects can be accomplished by the provision of a sliding-type mobile communication terminal having a first terminal body and a second terminal body, the first terminal body and the second terminal body being slid relative to each other while one of the first terminal body and the second terminal body is laid on the top of the other, wherein the terminal comprises: a motor for providing power necessary for a sliding movement; a power transmission unit connected to a rotary shaft of the motor for transmitting a driving force of the motor, the power transmission unit including a pair of engaging members, resilient means for selectively engaging the engaging members with each other and a guide cam for receiving the resilient means and one of the engaging members; a pinion connected to the power transmission unit and rotated by means of the driving force of the motor; the first terminal body having a rack attached thereto, the rack being engaged with the pinion, the first terminal body being slid relative to the second terminal body when the pinion is rotated; the second terminal body having the power transmission unit and the pinion, the motor being securely fixed to the second terminal body; an opening/closing operation switch disposed in the first terminal body or the second terminal body for applying an operation signal to the motor; and a control unit for controlling operation of the motor in response to the signal of the opening/closing operation switch.

Preferably, the sliding-type mobile communication terminal further comprises: a sensor unit having position detecting means for controlling the sliding movement of the first terminal body, and the driving control unit controls the operation of the motor in response to the signal from the position detecting means.

In accordance with another aspect of the present invention, there is provided a method of automatically driving a sliding-type mobile communication terminal having a first terminal body and a second terminal body, the first terminal body and the second terminal body being automatically slid relative to each other while one of the first terminal body and the second terminal body is laid on the top of the other, the method comprising the steps of: (a) applying a drive signal to a driving control unit; (b) detecting an initial position of a position detecting target by means of at least two detecting means spaced apart from each other by the moving distance of the first terminal body to determine the rotating direction of a driving motor, and applying a drive signal having the determined rotating direction to the driving motor; and (c) applying a drive-stop signal to the driving motor when one of the at least two detecting means detects the position detecting target within a prescribed period of time.

Preferably, the automatic driving method further comprises the step of: (d) applying a drive signal having the direction opposite to the rotating direction to the driving motor when the position detecting target is not detected by means of the at least two detecting means for a prescribed period of time, and performing the Step (c) again.

In accordance with another aspect of the present invention, there is provided a method of automatically driving a sliding-type mobile communication terminal having a first terminal body and a second terminal body, the first terminal body and the second terminal body being automatically slid relative to each other while one of the first terminal body and the second terminal body is laid on the top of the other, the method comprising the steps of: (a) applying a drive signal to a driving control unit; (b) detecting an initial position of the first terminal body to determine the rotating direction of a driving motor, and applying a drive signal having the determined rotating direction to the driving motor; and (c) applying a drive-stop signal to the driving motor when the prescribed number of in-phase signals is detected by means of position detecting means for detecting the rotation of a hinge shaft.

Preferably, the automatic driving method further comprises the step of: (d) automatically returning the first terminal body to the original position when the second terminal body is fully exposed or fully covered after the drive-stop signal is applied to the driving motor.

In accordance with yet another aspect of the present invention, there is provided a method of detecting an incoming call to a sliding-type mobile communication terminal having a first terminal body and a second terminal body, the first terminal body and the second terminal body being automatically slid relative to each other while one of the first terminal body and the second terminal body is laid on the top of the other, the method comprising the steps of: (a) receiving an incoming call from the outside; (b) applying an incoming call detection signal to a driving control unit of the sliding-type mobile communication terminal when the incoming call is detected; (c) determining an initial rotation direction of a driving motor by means of the driving control unit depending upon whether the second terminal body is exposed or covered; and (d) applying an operation signal to the driving motor of the sliding-type mobile communication terminal by means of the driving control unit so that the second terminal body can be repeatedly exposed and covered.

Preferably, the incoming call detecting method further comprises the steps of: (e) stopping the opening and closing operation of the first terminal body by means of the opening/closing operation switch; and (f) operating the driving motor of the sliding-type mobile communication terminal until the second terminal body is fully exposed when the second terminal body is covered after it is detected whether the second terminal body is exposed or covered.

BRIEF DESCRIPTION OF THE DRAWINGS

The above and other objects, features and other advantages of the present invention will be more clearly understood from the following detailed description taken in conjunction with the accompanying drawings, in which:

FIGS. 3A and 3B are views schematically showing a sliding-type mobile communication terminal according to the present invention;

DESCRIPTION OF THE PREFERRED EMBODIMENTS

Now, preferred embodiments of the present invention will be described in detail with reference to the accompanying drawings.

FIGS. 3A and 3B are views schematically showing a sliding-type mobile communication terminal according to the present invention.

As shown in FIGS. 3A and 3B, the sliding-type mobile communication terminal according to the present invention includes a rack 11 securely fixed to a first terminal body 10 in the longitudinal direction of the first terminal body 10 such that the first terminal body 10 and a second terminal body 20 are slid relative to each other, and a pinion 35 attached to the second terminal body 20 in such a manner that the pinion 35 is engaged with the rack 11. The sliding-type mobile communication terminal according to the present invention is easily opened and closed by means of power provided from a motor, which is compared to the conventional sliding-type mobile communication terminal.

Figure 1:
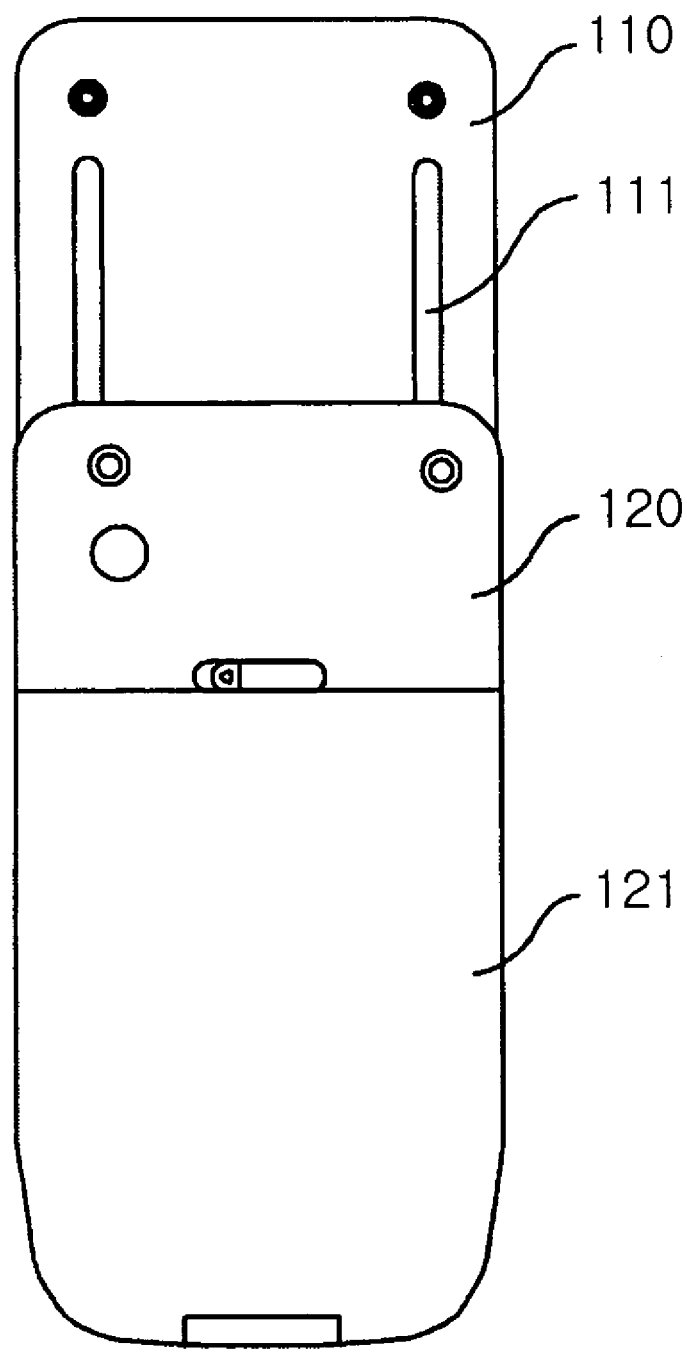
FIG. 1 is a rear view schematically showing a conventional sliding-type mobile communication terminal.
Figure 2:
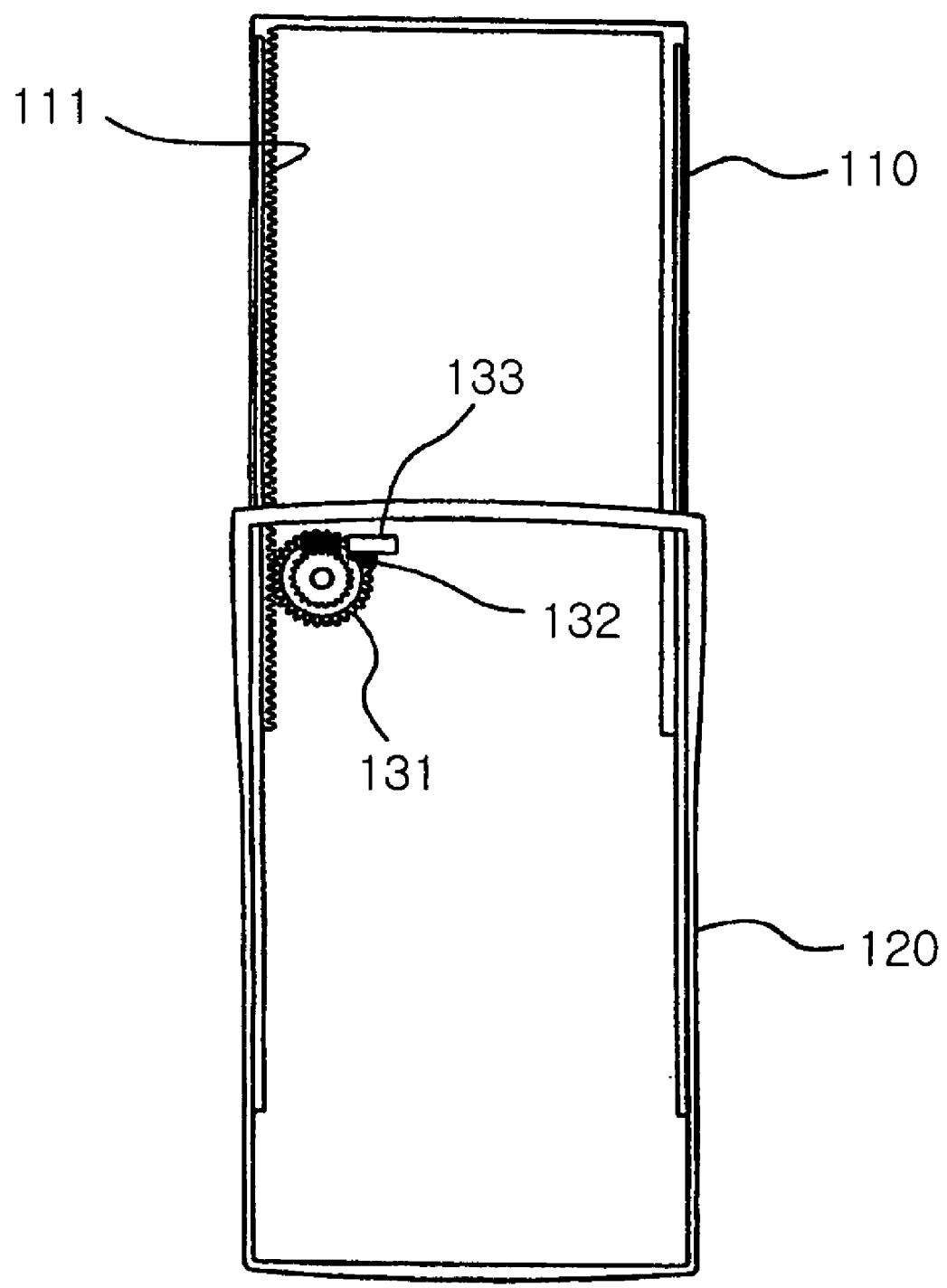
FIG. 2 is a cross-sectional view showing a conventional automatic sliding-type mobile communication terminal.
Figure 4:
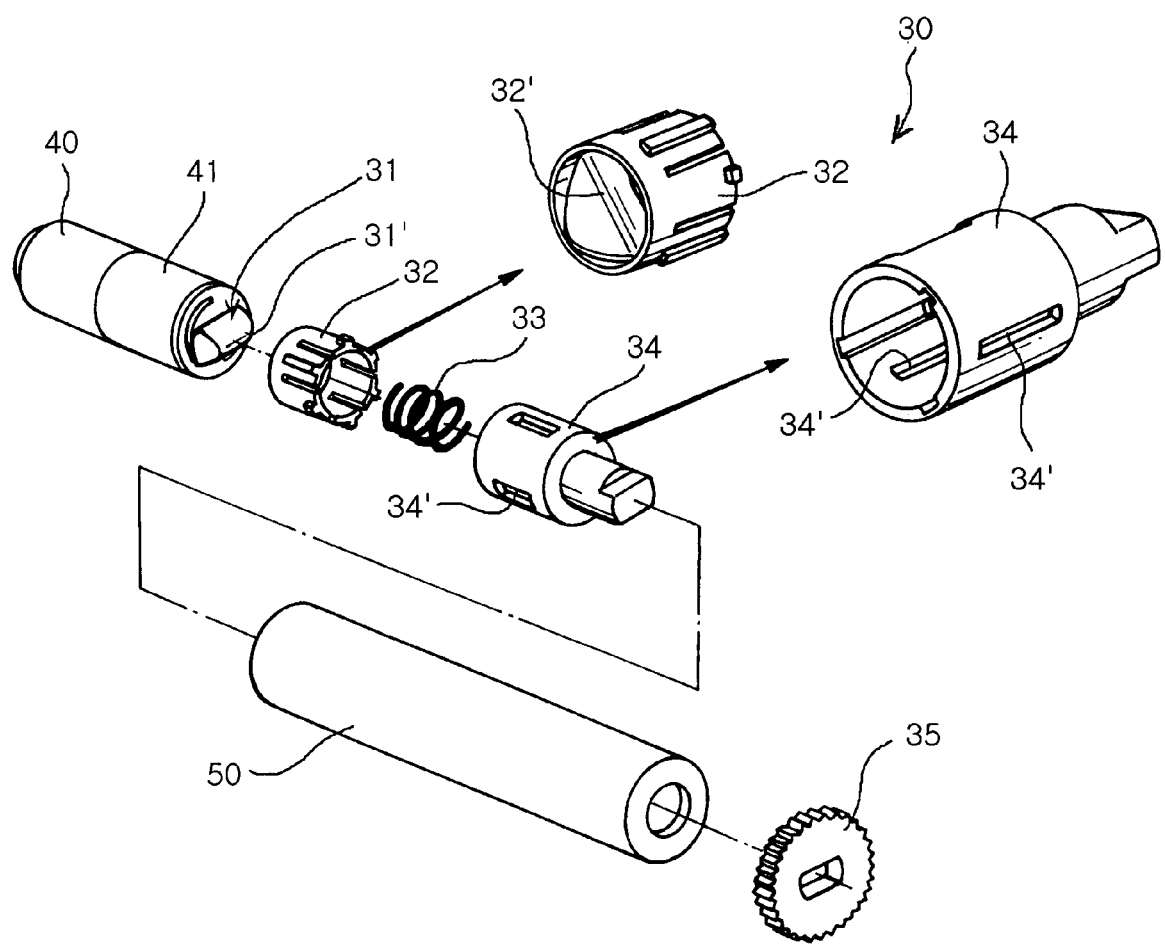
FIG. 4 is an exploded perspective view of the sliding-type mobile communication terminal according to the present invention.

The sliding-type mobile communication terminal according to the present invention further includes a cam assembly, which comprises a hinge shaft 31 fixed to a rotary shaft of the motor, a slide cam 32 selectively engageable with one end of the hinge shaft, and a guide cam 34 for relatively locking the slide cam 32 in the rotating direction and movably accommodating the slide cam 32 in the axial direction, whereby the sliding-type mobile communication terminal is more smoothly opened and closed when the sliding-type mobile communication terminal is not only automatically operated but also manually operated, which will be described in more detail below with reference to FIG. 4.

FIG. 4 is an exploded perspective view of the sliding-type mobile communication terminal according to the present invention.

The sliding-type mobile communication terminal according to the present invention includes a motor 40 securely fixed to a second terminal body for providing power necessary for a sliding movement, a power transmission unit 30 connected to the rotary shaft of the motor 40 for transmitting a driving force of the motor, a pinion 35 connected to the power transmission unit 35, a first terminal body 10 having a rack, which is engaged with the pinion 35, securely fixed thereto in the longitudinal direction of the first terminal body 10, and a second terminal body 20 having the power transmission unit and the pinion attached thereto.

The sliding-type mobile communication terminal according to the present invention further includes an opening/closing operation switch 12 for applying an operation signal to the motor, and a control unit (not shown) for controlling operation of the motor in response to the signal of the opening/closing operation switch 12.

The motor 40 serves to receive current from a battery mounted in the mobile communication terminal and to supply the power so that an automatic or semi-automatic sliding movement is carried out. The case of the motor 40 is fixed to the second terminal body.

Preferably, the motor may be a geared motor with a gearbox 41 disposed at the output side thereof. The gearbox 41 includes a planetary gear-type reducer having a reduction ratio of approximately 500 to 600:1 to amplify a driving torque. Consequently, the gearbox serves to perform a reduction function and a reversion preventing function at the same time.

The power transmission unit 30 includes a pair of engaging members, which are selectively engageable with each other, and resilient means 33 compressible or expandable so that the engaging members are selectively engaged with each other. The pair of engaging members comprises a hinge shaft 31 having one side securely fixed to the rotary shaft of the motor, and a slide cam 32 that can be selectively engaged with the hinge shaft 31.

The power transmission unit 30 further includes a guide cam 34 for relatively locking the slide cam 32 in the rotating direction and movably accommodating the slide cam 32 in the axial direction. One end of the guide cam 34 is engaged with the pinion.

The resilient means 33 is disposed between the slide cam 32 and the guide cam 34 for pressing the slide cam toward the hinge shaft 31. Preferably, the resilient means 33 is a compression coil spring.

The resilient means 33 has a resilient force, which is larger than the driving force of the motor and smaller than an external force. In the case of an automatic sliding movement, the resilient means 33 is expanded so that the slide cam 32 is engaged with the hinge shaft 31. As a result, the slide cam 32 is rotated. In the case of a manual sliding movement by means of the external force, on the other hand, the resilient means 33 is compressed so that the engagement of the hinge shaft 31 with the slide cam 32 is released.

The slide cam 32 is disposed in the guide cam 34 in such a manner that the slide cam 32 can be relatively locked in the rotating direction and moved in the axial direction. Specifically, the guide cam 34 has key grooves 34' formed at the circumference thereof. The slide cam 32 is locked in the key grooves 34'. Consequently, the slide cam 32 is locked by means of the guide cam 34 in the rotating direction so that the slide cam 32 can be rotated along with the guide cam 34 when the guide cam 34 is rotated, and the slide cam 32 can be moved in the axial direction by the length of each key groove 34'.

As shown in FIG. 4, one side of the hinge shaft 31 is connected to the rotary shaft of the motor 40, and the other side of the hinge shaft 31 is selectively engaged with the slide cam 32.

Specifically, a protrusion 31' having a prescribed shape is formed at the other side of the hinge shaft 31, and a depression 32', which corresponds to the protrusion 31', is formed at one side of the slide cam 32. The hinge shaft 31 serves as a male cam, and the slide cam 32 serves as a female cam.

Alternatively, the hinge shaft 31 may serve as a female cam having a depression, and the slide cam 32 may serve as a male cam having a protrusion.

With the above-mentioned structure in which the female cam is engaged with the male cam, the hinge shaft is rotated by means of a rotating force of the motor 40 when the mobile communication terminal is automatically slid. Consequently, the slide cam 32 is rotated along with the hinge shaft 31 since the protrusion 31' is engaged with the depression 32'.

In the case of a manual sliding movement, the guide cam 34 is rotated by means of the rotation of the pinion 35. Consequently, the slide cam 32 is rotated. In this case, the hinge shaft 31 is not rotated since the motor 40 is not operated. On the other hand, the slide cam 32 is rotated with the result that the protrusion 31' of the hinge shaft may be improperly engaged with the depression 32' of the slide cam.

Preferably, the shapes of the depression and the protrusion may be changed such that the male cam and the female cam are engaged with each other at every desired angles. For example, the male cam and the female cam are engaged with each other at every 180 degrees in the case that the protrusion of the hinge shaft is formed in the shape of a "–" as shown in FIG. 4. In other words, the protrusion of the male cam is engaged with the depression of the female cam whenever the protrusion of the male cam is rotated. Consequently, the protrusion of the male cam is engaged twice with the depression of the female cam when the hinge shaft is rotated by 360 degrees.

Similarly, the male cam and the female cam are engaged with each other at every 90 degrees in the case that the protrusion of the hinge shaft is formed in the shape of a "+", and the male cam and the female cam are engaged with each other at every 120 degrees in the case that the protrusion of the hinge shaft is formed in the shape of a "Y". In this way, various kinds of female and male cams, which are engaged with each other at a prescribed angle, may be provided through the modification of the shapes of the protrusion and the depression.

Figure 5A:
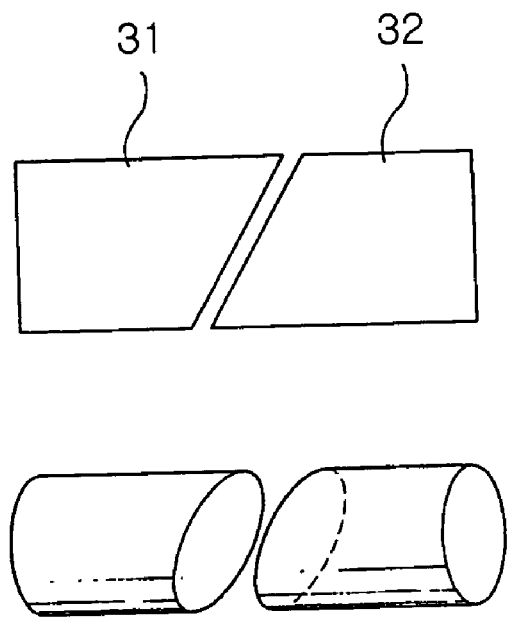
FIGS. 5A and 5B are views showing a hinge shaft and a slide cam, which are engaged with each other at every 360 degrees, according to a preferred embodiment of the present invention.
Figure 5B:
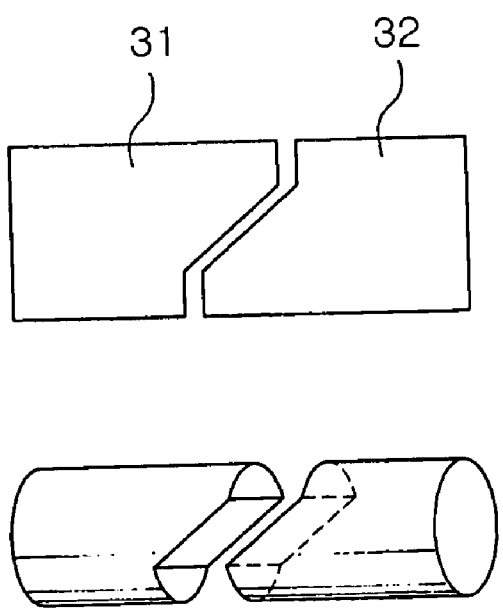

More preferably, the male cam and the female cam may have shapes as shown in FIG. 5 such that the hinge shaft and the slide cam are engaged at every 360 degrees. In the case that the hinge shaft and the slide cam are engaged at every 360 degrees, the sliding movement is accomplished simply by one rotation of the pinion. Consequently, the manual sliding operation can be more easily and smoothly carried out, which will be described in detail below.

The motor 40, the hinge shaft 31, the slide cam 32, the resilient means 33, and the guide cam 34 may be disposed in a housing 50, as shown in FIG. 4. The motor 40 is securely fixed to the housing 50.

Preferably, a bearing may be provided so that the guide cam can be smoothly rotated in the housing 50. The housing 50 is securely fixed to the second terminal body.

One end of the guide cam 34 is exposed to the outside of the housing 50 through a hole formed at one side of the housing 50. The exposed end of the guide cam 34 is connected to the pinion 35.

The pinion 35 is engaged with the guide cam 34 of the power transmission unit 30 so that the pinion 35 can be rotated. The rack 11 is engaged with the pinion so that the first terminal body can be slid.

It is possible to use a friction gear, which is operated by means of friction, instead of using the rack and pinion.

Also, the sliding-type mobile communication terminal according to the present invention further includes a opening/closing operation switch 12 for inputting information on whether the motor is operated or not and the direction of the operation, and a driving control unit (not shown) for controlling operation of the motor in response to the signal inputted to the opening/closing operation switch 12.

The switch 12 is actuated by means of an actuating force of a user so that the driving means is operated by means of the switch 12. When the user actuates the switch 12, the switch 12 outputs a prescribed electric signal to the motor 40. The switch 12 is provided at one side of the terminal body of the mobile communication terminal in the form of a common on/off switch, although the switch 12 may be provided in various forms on the basis of the shape of the mobile communication terminal and the position where an actuating force of the user is easily applied. In this embodiment, the opening/closing operation switch 12 is an exclusive switch for accomplishing an automatic sliding movement. However, it is also possible to use a button with different functions.

The forward/reverse operation of the driving means is controlled by means of the actuation of the switch 12 so that the second terminal body can be opened while the second terminal body is closed, and the second terminal body can be closed while the second terminal body is opened.

Preferably, the sliding-type mobile communication terminal according to the present invention further includes a sensor unit having position detecting means for controlling the sliding movement of the first terminal body 10. The driving control unit controls the operation of the motor 40 in response to the signal from the position detecting means.

More preferably, the position detecting means may be a sensor for directly detecting relative position between the first terminal body and the second terminal body (a full opening position and a full closing position), or a sensor for detecting rotation of the hinge shaft securely fixed to the shaft of the motor. It is also possible to provide the position detecting sensor and the rotation detecting sensor at the same time. The position detecting means will be described in detail below with reference to the accompanying drawings.

First, a detailed description will be made of the sensor unit having the position detecting means for directly detecting the relative position between the first terminal body and the second terminal body (the full opening position/the full closing position) to recognize that the sliding movement has been completed.

Figure 6:
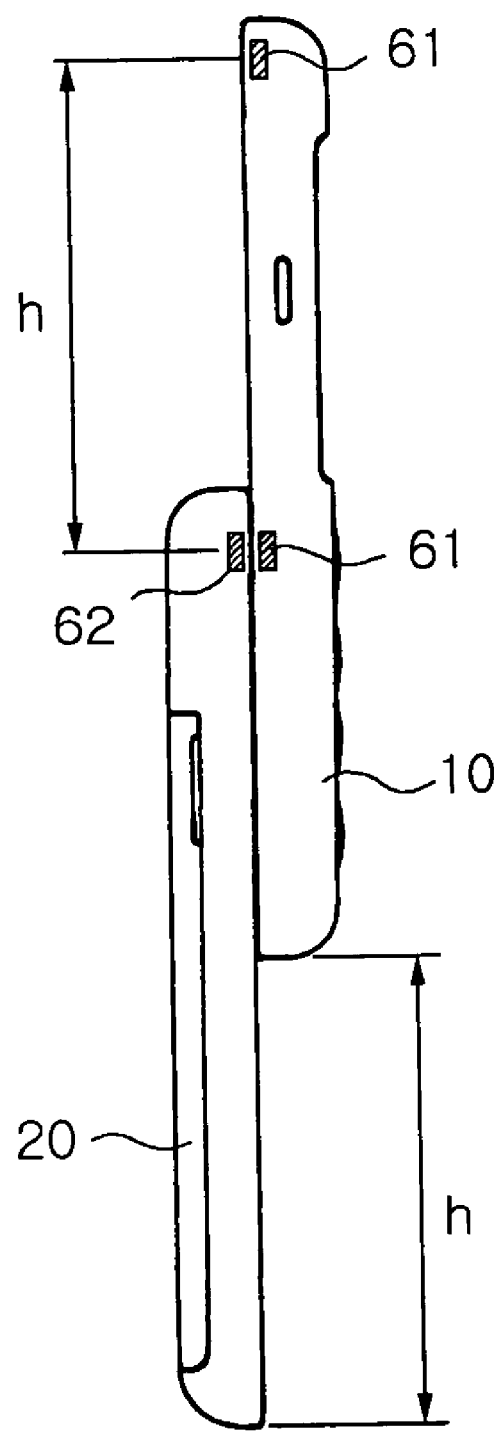
FIG. 6 is a view showing an automatic sliding-type mobile communication terminal with position detecting means for detecting relative position between a first terminal body and a second terminal body according to a preferred embodiment of the present invention.

FIG. 6 is a view showing an automatic sliding-type mobile communication terminal with position detecting means for detecting completion of the sliding movement according to a preferred embodiment of the present invention.

The driving motor is driven in order to automatically operate the sliding-type mobile communication terminal. At this time, it is required to accurately drive the driving motor to the opening position and the closing position. To this end, the position detecting means as shown in FIG. 6 is used in the sliding-type mobile communication terminal of the present invention.

As shown in FIG. 6, completion of the sliding movement of the first terminal body 10 is detected by means of the position detecting means 61 and 61' attached to the first terminal body 10 and the position detecting means 62 attached to the second terminal body 20. The opening and closing positions of the first terminal body can be accurately controlled by means of the position detecting means.

The position detecting means 61, 61' and 62 are electrically connected to a control circuit (not shown) of the driving control unit that controls the operation of the motor 40. When the completion of the sliding movement is detected, the operation of the motor 40 is automatically stopped by means of the driving control unit so that the sliding movement can be automatically finished.

The position detecting means 61, 61' and 62 comprise at least two detecting means A(61) and B(61') attached to the upper and lower ends of the first terminal body 10, respectively, and a position detecting target C(62) attached to the upper end of the second terminal body 20 in such a manner that the position detecting target corresponds to the two detecting means 61 and 61'.

The above-mentioned at least two detecting means 61 and 61' are spaced apart from each other by a moving distance h of the first terminal body 10 when the first terminal body 10 is opened and closed, i.e., a stroke of the first terminal body 10. Specifically, the detecting means B(61') is attached to the lower end of the first terminal body at the position where the position detecting target C(62) can be detected by means of the detecting means B(61') when the first terminal body is fully closed. The detecting means A(61) is attached to the upper end of the first terminal body at the position where the position detecting target C(62) can be detected by means of the detecting means A(61) when the first terminal body is fully opened.

Preferably, the detecting means A(61) and B(61') and the position detecting target C(62) may be provided in the form of a contact sensor that is switchable by means of a contact operation, or a non-contact sensor that is switchable without the contact operation.

In the case that the position detecting means 61, 61' and 62 are provided in the form of the non-contact sensors, it is required that the detecting means A(61) and B(61') of the first terminal body 10 be sensors that can be switched when a magnetic field is detected, and the position detecting target C(62) of the second terminal body 20 be a magnet that generates a magnetic field. As the non-contact sensor, a hall sensor comprised of Hall ICs and a sensor using magneto-resistance effect elements (MR elements) may be used.

In the case that the position detecting means 61, 61' and 62 are provided in the form of the contact sensor, it is required that the detecting means A(61) and B(61') of the first terminal body 10 be switch terminals that are switchable by means of depression, and the position detecting target C(62) of the second terminal body 20 be a contact terminal formed in the shape of a fine protrusion for pressing the switch terminals.

Figure 7A:
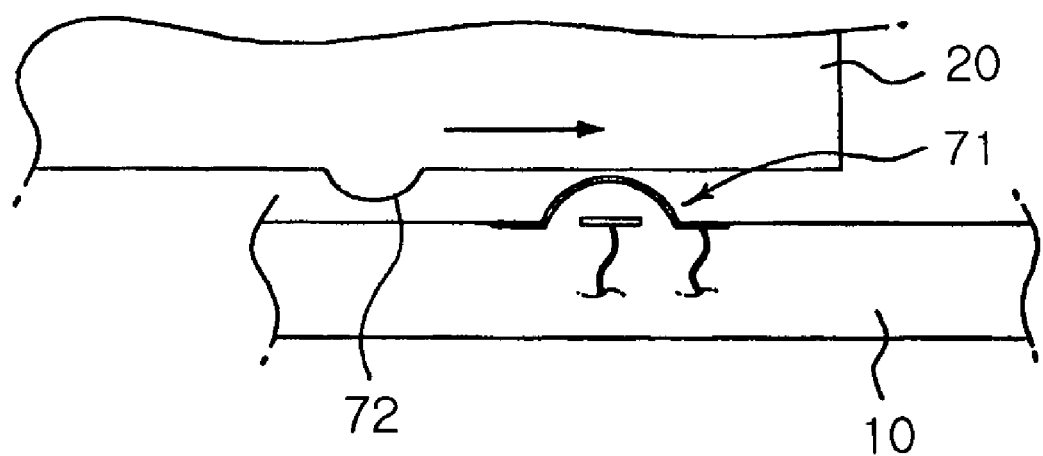
FIGS. 7A and 7B are views illustrating operation of a contact sensor according to the present invention.
Figure 7B:
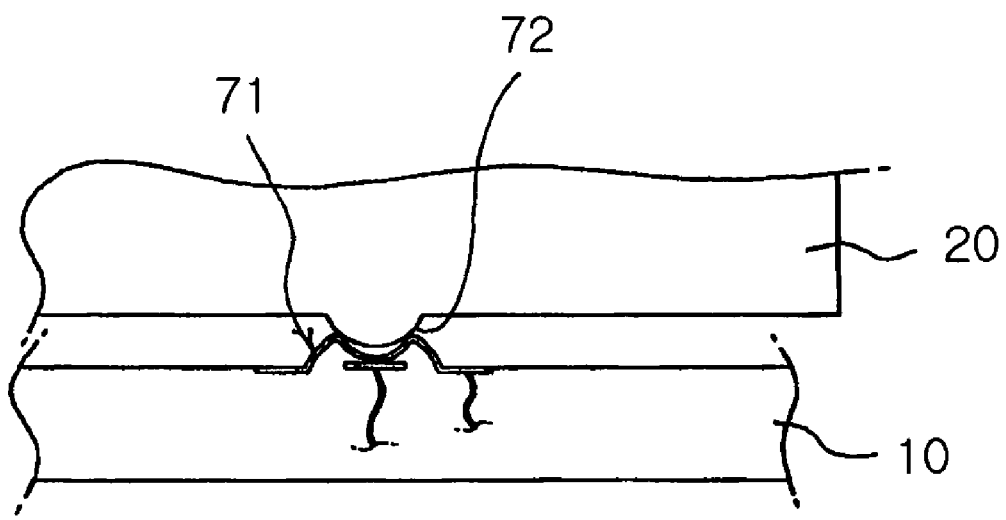

FIGS. 7A and 7B are views illustrating operation of a contact sensor according to the present invention. As shown in FIGS. 7A and 7B, the position detecting target C(62) may be a protrusion 72 formed at one side of the second terminal body 20, and the detecting means A(61) and B(61') may be thin domelike switches 71 formed at one side of the first terminal body.

The protrusion 72 is moved along with the second terminal body 20 as the second terminal body 20 is moved. When the protrusion 72 contacts the thin domelike switch 71, the dome part of the thin domelike switch 71 is depressed downward as shown in FIG. 7B. As a result, the protrusion 72 contacts a contact point disposed in the thin domelike switch 71. In this way, a switching operation is carried out.

Alternatively, it is possible that at least two detecting means A(61) and B(61') are attached to the upper and lower ends of the second terminal body 20, respectively, and a position detecting target C(62) is attached to the lower end of the first terminal body 10 in such a manner that the position detecting target C(62) corresponds to the detecting means A(61) and B(61') of the second terminal body 20.

Next, a detailed description will be made of the sensor unit having the position detecting means for detecting rotation of the hinge shaft 31 securely fixed to the shaft of the motor 40 to control the sliding movement.

Figure 8A:
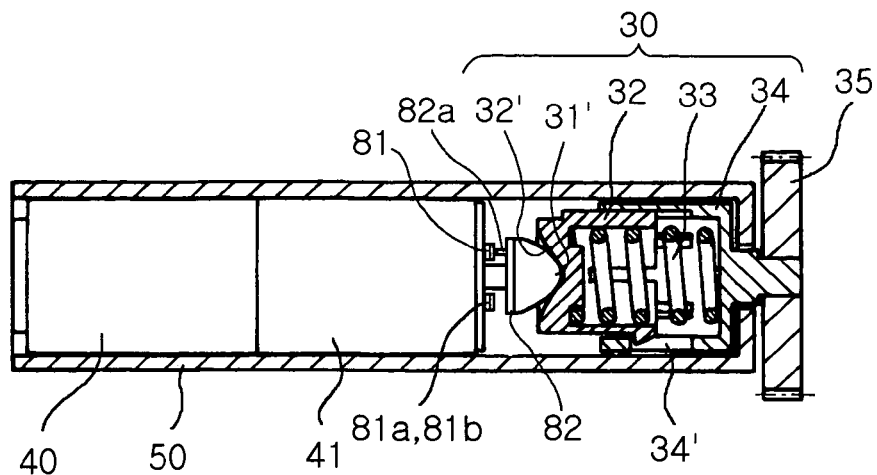
FIGS. 8A, 8B and 8C are views showing an automatic sliding-type mobile communication terminal with position detecting means for detecting rotation of a hinge shaft according to a preferred embodiment of the present invention.
Figure 8B:
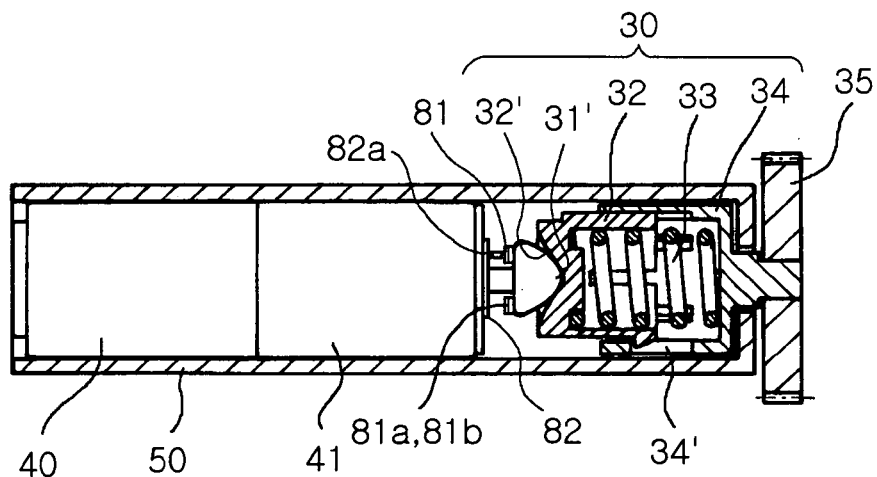

FIGS. 8A and 8B are views showing a contact sensor having a brush housing and a rectifying housing for detecting the rotating angles of the hinge shaft 31.

As shown in FIG. 8A, the position detecting means comprises a rectifying housing 81 and a brush housing 82. The rectifying housing 81 includes a first pattern 81a having the positive pole and a second pattern 81b having the negative pole. The first pattern 81a and the second pattern 81b are opposite to the gear body 41 of the motor 40 and the hinge shaft 31, respectively. The first pattern 81a and the second pattern 81b are electrically connected to each other at a prescribed angle when the power transmission unit is rotated. The brush housing 82 includes a brush 82a.

The rectifying housing 81 and the brush housing 82 are securely fixed to the gear box 41 of the motor and the hinge shaft 31, respectively. The brush housing is rotated along with the hinge shaft when the hinge shaft is rotated. On the other hand, the rectifying housing is not rotated since the motor is not operated.

When the first pattern 81 and the second pattern 81b of the rectifying housing 81 securely fixed to the gear box 41 of the motor contact the brush 82a of the brush housing 82 securely fixed to the hinge shaft 31, the first pattern 81a and the second pattern 81b are electrically connected to each other, which is detected at the in-phase state, and the detected signal is transmitted to the driving control unit.

For the position detecting means as shown in FIG. 8B, the brush housing 82 is attached to one side of the gear box 41 of the motor 40, and the rectifying housing 81 is attached to one side of the hinge shaft 31 in the direction opposite to the brush housing 82, so that information of the in-phase can be detected.

Figure 9A:
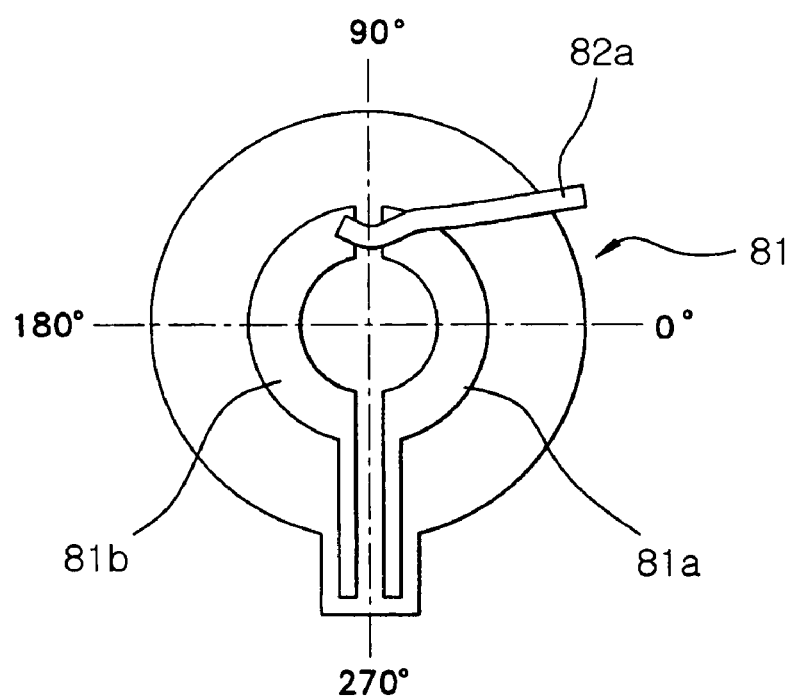
FIGS. 9A and 9B are views showing a rectifying housing according to a preferred embodiment of the present invention.
Figure 9B:
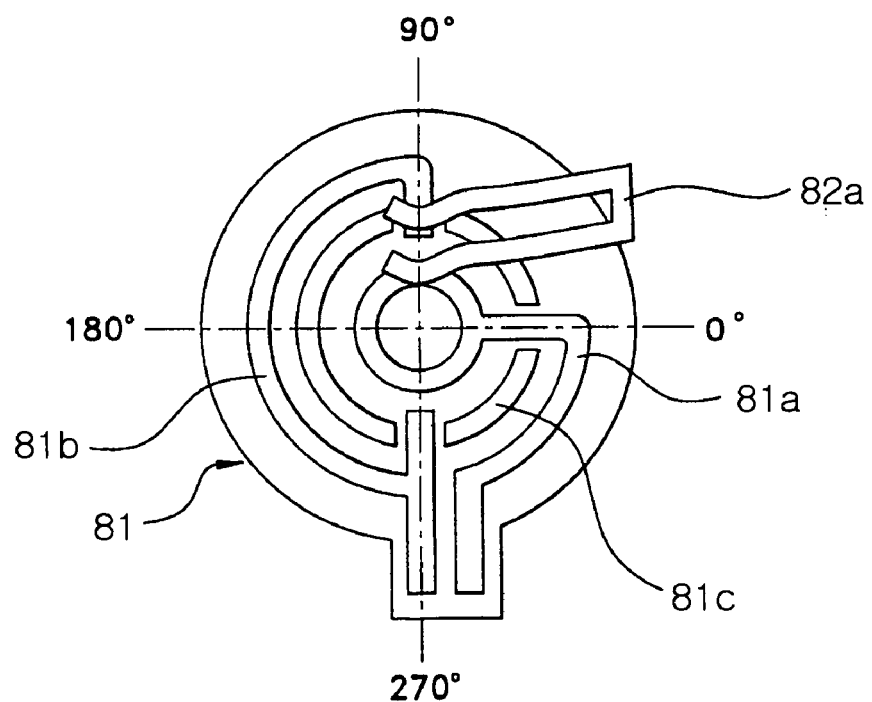

The position detecting means may be formed in the shapes as illustrated in FIGS. 9A and 9B, which show a rectifying housing according to a preferred embodiment of the present invention. The rectifying housing 81 includes positive and negative patterns, which can be electrically connected to each other, attached to one side thereof. For example, the rectifying housing 81 may include a first pattern 81a having a positive pole and a second pattern 81b having a negative pole. Alternatively, the rectifying housing 81 may include a first pattern 81a having a negative pole and a second pattern 81b having a positive pole. The brush housing 82 includes at least one brush 82a, which electrically connects the first pattern 81a and the second pattern 81b of the rectifying housing 81 so that the first pattern 81a and the second pattern 81b can be electrically connected to each other at a prescribed angle.

For the rectifying housing as shown in FIGS. 9A and 9B, the first pattern 81a and the second pattern 81b are electrically connected to each other at every 90 degrees and at every 270 degrees so that the 180 degrees rotation of the hinged shaft is detected. It is also possible to use various rectifying housing shapes for accomplishing the electric connection at a prescribed angle.

In another embodiment, a non-contact sensor or another contact sensor may be used to detect the rotation of the hinge shaft instead of using the rectifying housing and the brush housing.

Figure 8C:
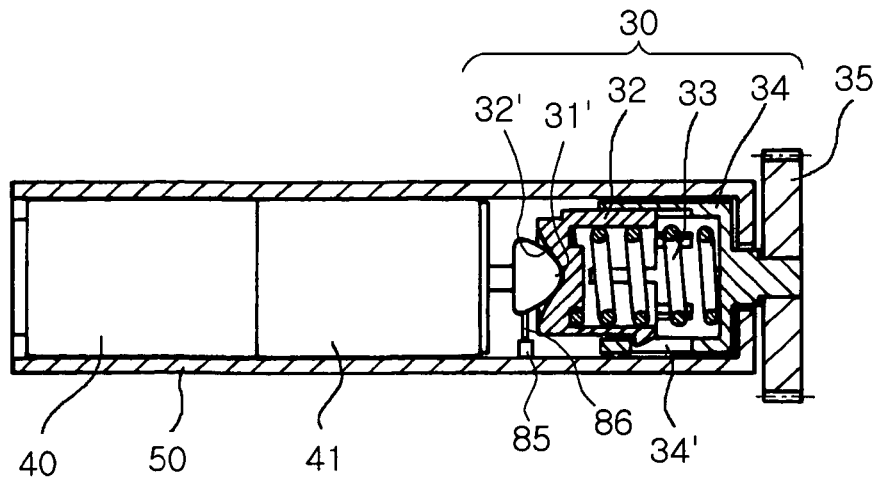

In yet another embodiment, contact sensors 85 and 86 or non-contact sensors may be attached to the inside of the housing 50 while being opposite to the circumference of the hinge shaft 31, as shown in FIG. 8C, so that the rotation of the hinge shaft is detected.

The non-contact sensor may comprise a sensor that is switchable when a magnetic field is detected, and a magnet that generates a magnetic field, as mentioned above. As the non-contact sensor, a hall sensor comprised of Hall ICs and a sensor using magneto-resistance effect elements (MR elements) may be used.

The sliding-type mobile communication terminal with the above-stated construction according to the present invention can be operated in an automatic/semi-automatic mode or an automatic/manual mode depending upon kinds of sensor attached to the mobile communication terminal. Specifically, the sliding-type mobile communication terminal can be operated in the automatic/semi-automatic mode when a sensor for detecting the relative position between the first terminal body and the second terminal body (a full opening position/a full closing position) is used. On the other hand, the sliding-type mobile communication terminal can be operated in the automatic/manual mode when the rotation of the hinge shaft 31 securely fixed to the shaft of the motor is detected.

The principle of the automatic sliding movement of the sliding-type mobile communication terminal according to the present invention will now be described with reference to FIG. 3 and FIG. 10A, which shows the secure engagement of the hinge shaft and the slide cam.

When a user press the opening/closing operation switch 12 while the second terminal body 20 is covered, the driving control unit (not shown) determines whether the second terminal body is exposed or covered, and then the first terminal body 10 is slid in the direction in which the second terminal body is exposed in response to a signal inputted from the switch. It should be noted that the first terminal body 10 is slide in the opposite direction while the second terminal body is exposed.

Determination as to whether the second terminal body is covered or exposed can be made by means of a circuit included in the mobile communication terminal. For example, the LCD may be turned on by means of the circuit when the upper terminal body is opened by a user, and the LCD may be turned off by means of the circuit when the upper terminal body is closed by the user.

Figure 10A:
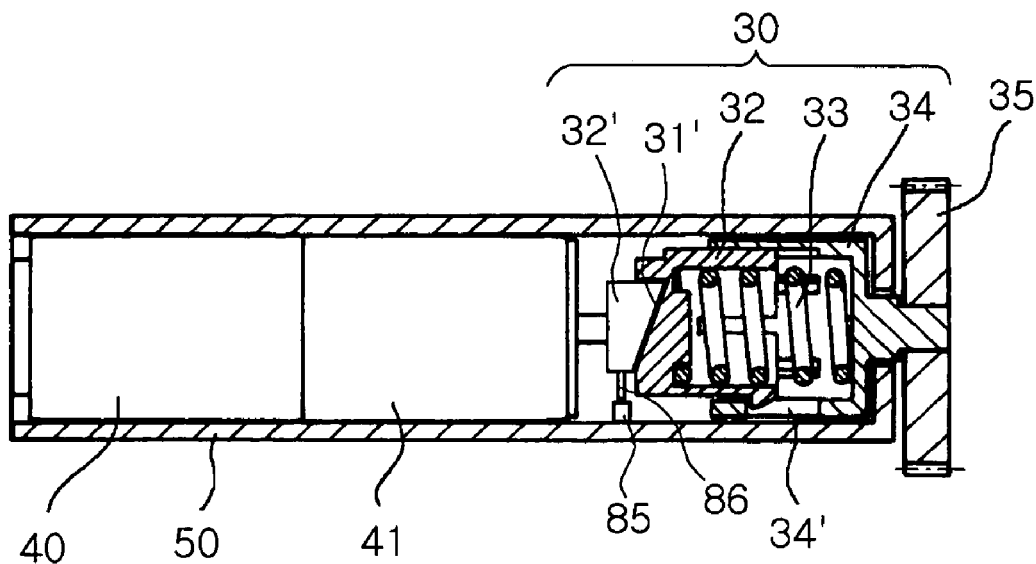
FIGS. 10A and 10B are views illustrating automatic and manual operation of a sliding-type mobile communication terminal according to the present invention.

When the motor 40 is operated as shown in FIG. 10A, the hinge shaft 31 connected to the rotary shaft of the motor 40 is rotated. As the hinge shaft 31 is rotated, the slide cam 32 selectively engaged with the hinge shaft 31 is rotated. Specifically, the hinge shaft 31 and slide cam 32 are rotated together while the protrusion 31' of the hinge shaft is engaged with the depression 32' of the slide cam.

Also, the guide cam 34, which locks the slide cam 32, is also rotated. As a result, the pinion 35 is rotated along with the guide cam 34.

In conclusion, the pinion 35 is linearly moved on the rack 11, which is attached to the first terminal body such that the rack 11 is engaged with the pinion 35, while the pinion 35 is rotated. Consequently, the first terminal body 10 and the second terminal body 20 are automatically slid relative to each other.

The automatic sliding movement of the sliding-type mobile communication terminal with the sensor unit having the position detecting means attached is carried out as follows.

First, the automatic sliding movement will be described in the case that the sliding-type mobile communication terminal includes position detecting means for directly detecting the relative position between the first terminal body and the second terminal body (the full opening position or the full closing position) to recognize the completion of the sliding movement.

When the first terminal body reaches the full opening position in the case that the first terminal body 10 is automatically slid so that the second terminal body is exposed as shown in FIG. 6, the detecting means B(61') attached to the first terminal body and the position detecting target C(62) are switched while being opposite to each other.

An electric signal generated by the switching of the detecting means B(61') and the position detecting target C(62) is applied to the driving control unit, by which the operation of the motor 40 is stopped. Consequently, the sliding movement of the first terminal body 10 is finished.

When the first terminal body reaches the full closing position in the case that the first terminal body 10 is automatically slid so that the second terminal body is covered, on the other hand, the detecting means A(61) attached to the first terminal body and the position detecting target C(62) are switched while being opposite to each other.

An electric signal generated by the switching of the detecting means A(61) and the position detecting target C(62) is applied to the driving control unit, by which the operation of the motor 40 is stopped. Consequently, the sliding movement of the first terminal body 10 is finished.

As described above, the sliding-type mobile communication terminal can be automatically slid to the full opening position or the full closing position by using the sensor for detecting the full opening or the full closing of the first terminal body and the second terminal body.

Here, the position detecting means may be the above-mentioned non-contact sensor or another contact sensor. In any case, the automatic sliding movement can be accomplished according to the above-mentioned principle.

Next, the automatic sliding movement will be described in the case that the sliding-type mobile communication terminal includes position detecting means for detecting rotation of the hinge shaft 31 securely fixed to the shaft of the motor 40 to control the sliding movement.

The position detecting means may be a contact sensor or a non-contact sensor, and the position detecting means may be disposed at any position, although the principle of automatic sliding movement is identically applied to any case. The automatic sliding movement will be described below with reference to FIG. 8A.

When a user presses the opening/closing operation switch 12 while the second terminal body 20 is covered or exposed, the automatic sliding movement is carried out. Specifically, the hinge shaft 31 securely fixed to the motor is rotated as the motor 40 is operated, and therefore the slide cam 42 engaged with the hinge shaft 31 is also rotated. Consequently, the first terminal body 10 is slid.

At this time, a phase difference occurs between the rectifying housing 81 fixed to the side of the motor and the brush housing fixed to the hinge shaft 31 as the hinge shaft 31 is rotated. When the first pattern 81a and the second pattern 81b of the rectifying housing 81 are electrically connected to each other via the brush 82a of the brush housing 82, an in-phase signal is detected.

When the hinge shaft 31 is rotated by one revolution, the pinion 35 is moved on the rack while being rotated by one revolution (i.e., the moving distance of the first terminal body=D (diameter of the pinion)×π). Consequently, the first terminal body can be slid from the closed position to the opened position or from the opened position to the closed position by rotating the pinion desired angles in response to the diameter of the pinion so that the first terminal body can be moved by a desired stroke.

In order to automatically rotate the pinion prescribed angles, it is required to control the number of in-phase signals generated when the brush housing and the rectifying housing are electrically connected to each other.

In the case that the pinion is to be rotated 540 degrees using the rectifying housing electrically connected at every 180 degrees, for example, it is required that the operation of the motor be stopped after the in-phase signal is detected three times.

Especially when the opening operation or the closing operation is finished after the pinion is rotated 360 degrees using the rectifying housing electrically connected at every 360 degrees, it is required that the operation of the motor be stopped after the in-phase signal is detected only once.

In the case of the automatic sliding movement, the rotation of the hinge shaft is stopped on the basis of how many times the in-phase signal is detected, which is prescribed. In the case of the manual sliding movement, on the other hand, the reverse rotation of the motor is prevented so that the hinge shaft is not rotated. Consequently, the hinge shaft is always maintained with a constant phase.

Control of the operation on the basis of how many times the in-phase signal is generated by detecting the rotation of the hinge shaft may be identically applied to a non-contact sensor or another contact sensor.

Consequently, the automatic sliding movement is accomplished by controlling the motor on the basis of how many times the in-phase signal is generated at the sensor, which detects the rotation of the hinge shaft 31.

The present invention has an advantage in that the sliding-type mobile communication terminal can be more easily and smoothly opened and closed through the above-mentioned automatic sliding movement, as compared to the conventional mobile communication terminal in which the upper terminal body is slid only using the pinion and the rack.

According to the present invention, a semi-automatic sliding movement is also possible in the case of providing position detecting means for directly detecting the relative position between the first terminal body and the second terminal body to recognize the completion of the sliding movement.

When the user slides the first terminal body in order to expose the second terminal body 20, the switching of the detecting means A(61) and the position detecting target C(62) shown in FIG. 6 is released, whereby an OFF (Low) signal is generated.

At this time, the driving control unit recognizes the OFF signal, and thus the motor 40 is operated in the direction of exposing the second terminal body.

When the user applies an external force to the terminal body so that the terminal body is initially slid, on the other hand, the motor 40 is not operated. Consequently, the resilient means 33 is compressed by means of the force transmitted to the pinion 35 and the rack 11, whereby the engagement of the hinge shaft 31 and the slide cam 32 is released, and thus only the slide cam 32 is rotated (the hinge shaft is not rotated).

When the motor 40 is operated, however, the hinge shaft 31 is also rotated, whereby the hinge shaft and the slide cam are engaged with each other, which is identical to the case of the automatic sliding movement.

While the sliding movement is carried out so that the terminal body is opened, the detecting means B(61') and the position detecting target C(62) shown in FIG. 6 are switched, by which an ON (HIGH) signal is generated. As a result, the operation of the motor is stopped, and the semi-automatic sliding movement is finished.

When the first terminal body is slid so that the second terminal body 20 is covered, the sliding movement is carried out on the basis of the principle as mentioned above.

When the sliding movement is interrupted by means of an external force during the automatic or semi-automatic sliding movement in the case of providing the position detecting means for directly detecting the relative position between the first terminal body and the second terminal body to recognize the completion of the sliding movement, the rotation of the slide cam 32 is restricted. As a result, the hinge shaft is rotated without load, and therefore the detecting means A and B and the position detecting target C are not switched for a prescribed period of time.

In the case that the detecting means A and B and the position detecting target C are not switched for a prescribed period of time as described above, the motor may be operated in the opposite direction or the operation of the motor may be stopped so that the terminal body is retuned to its original position, which will be described in detail below.

The manual sliding movement is also possible in addition to the above-mentioned automatic sliding movement in the case of providing the position detecting means for detecting the rotation of the hinge shaft 31 securely fixed to the shaft of the motor 40 to control the sliding movement.

Preferably, the hinge shaft and the slide cam are engaged with each other at every 360 degrees, and the sliding movement is completed as the pinion is rotated by one revolution, in order to manually accomplish the full opening or closing operation by an external force only once while the mobile communication terminal is more easily and smoothly opened or closed as compared to the conventional mobile communication terminal.

Figure 10B:
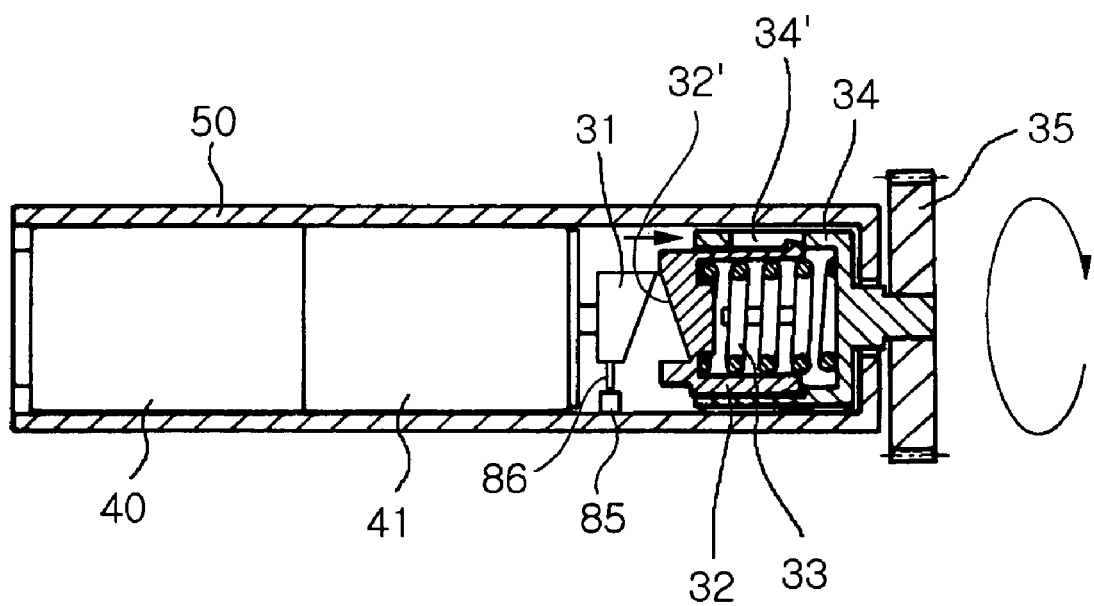

The manual sliding movement of the mobile communication terminal will be described in detail below with reference to FIGS. 3, 10A and 10B.

When a user push the first terminal body 10 while the first terminal body 10 is closed so that the first terminal body 10 is opened, the pinion 35 is rotated and moved along the rack 11 attached to the first terminal body 10. At this time, the guide cam 34 connected to the pinion 35 is also rotated. And the slide cam 32 locked by means of the guide cam 34 is rotated along with the guide cam 34. Consequently, the engagement of the protrusion 31' of the hinge shaft with the depression 32' of the slide cam is released, whereby the protrusion 31' of the hinge shaft is offset from the depression 32' of the slide cam, as shown in FIG. 10B. As a result, the protrusion 31' of the hinge shaft pushes the slide cam 32 in the axial direction (as indicated by the arrow). The slide cam 32 is pushed in the axial direction so that the resilient means 33 is compressed.

When the manual sliding movement is carried out, the slide cam 32 is rotated and moved in the axial direction while the motor 40 is not operated. As a result, the resilient means 33 is compressed, by which the above-mentioned offset occurs. When the offset angle is below 180 degrees, the first terminal body 10 is returned to its original position, i.e., in the direction of the closing the first terminal body 10, by means of a restoring force of the resilient means 33. When the offset angle is above 180 degrees, the first terminal body 10 is moved to the full opening position by means of the restoring force of the resilient means 33.

As described above, the manual sliding movement can be carried out according to the present invention. Especially, the mobile communication terminal can be more smoothly opened or closed by virtue of the structure of the power transmission unit, as compared to the conventional mobile communication terminal. Also, the first terminal body of the mobile communication terminal can be returned to its original position by means of the restoring force of the resilient means.

When an external force is applied to the sliding-type mobile communication terminal during the automatic sliding movement, on the other hand, the above-mentioned offset may occur. In this case, the first terminal body of the mobile communication terminal can be returned to its original position by means of the restoring force of the resilient means.

The present invention also provides a method of automatically driving the sliding-type mobile communication terminal with the above-stated construction.

First, the automatic driving method will be described in the case of providing position detecting means for directly detecting the relative position between the first terminal body and the second terminal body (the full opening position or the full closing position) to recognize the completion of the sliding movement. The automatic driving method comprises the following steps.

Figure 11:
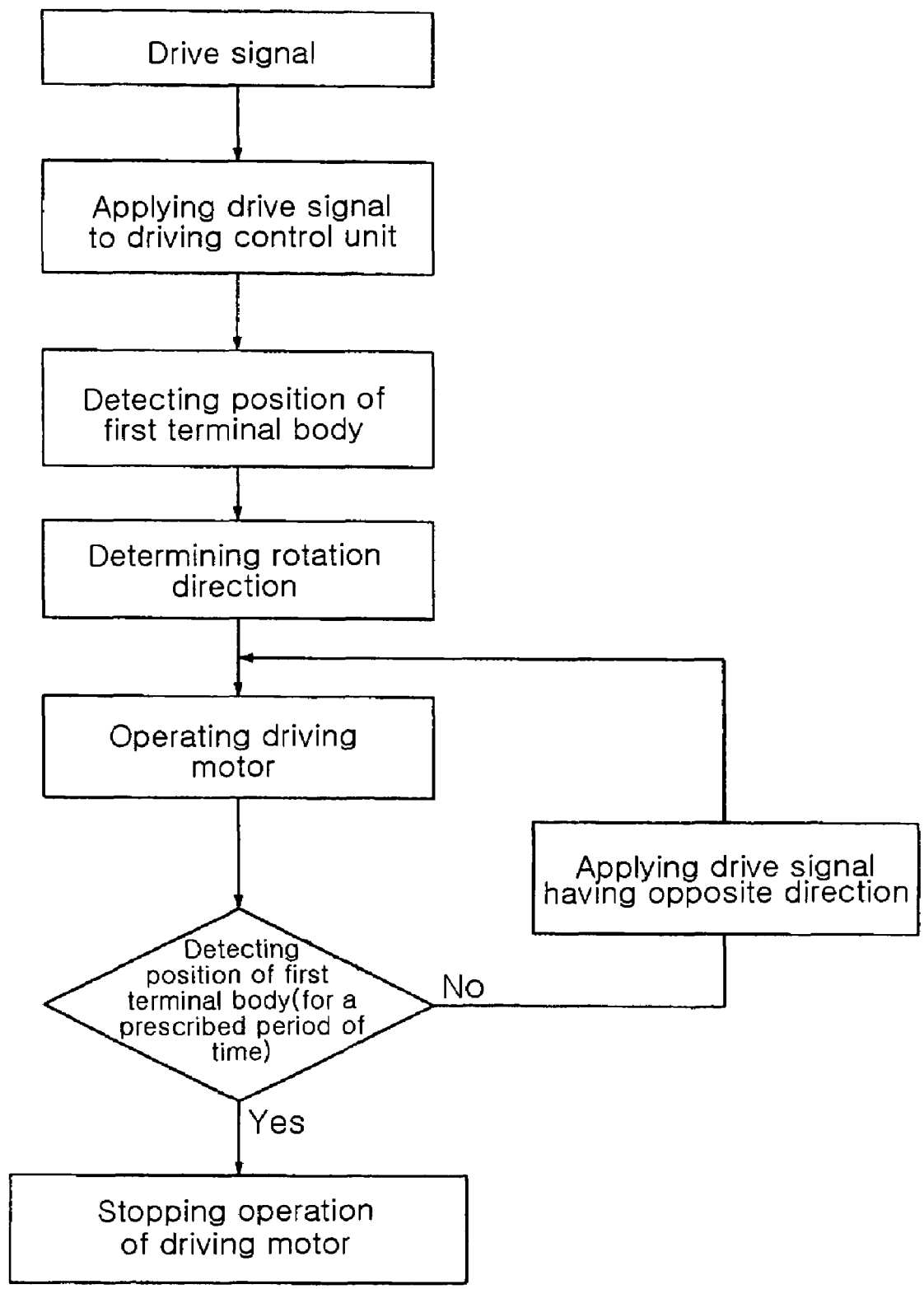
FIG. 11 is a flowchart showing a method of automatically driving an automatic sliding-type mobile communication terminal.

FIG. 6 shows an automatic sliding-type mobile communication terminal with position detecting means for directly detecting the full opening or full closing, and FIG. 11 is a flowchart showing the automatic driving method according to the present invention.

(a) Step for Applying a Drive Signal to the Driving Control Unit:

First, an initial drive signal for moving the sliding-type mobile communication terminal to the opening or closing position is applied to the driving control unit. The drive signal may be generated by means of the operation of the opening/closing operation switch 12 attached to the first terminal body or the second terminal body. A button having different functions, which is attached to the side of the sliding-type mobile communication terminal, may be used instead of the switch 12.

The drive signal may be generated through the detection of the positional separation of the position detecting target C(62) by means of the detecting means A(61) or B(61') as shown in FIG. 6. When a user manually slides the first terminal body while the second terminal body is covered, for example, the detecting means A(61) detects the positional separation of the position detecting target C(62), which is applied to the driving control unit as a drive signal. In this way, the above-mentioned semi-automatic sliding movement is initiated. The sliding movement is carried out in the same manner in the case that the second terminal body is exposed.

(b) Step for detecting an initial position of the position detecting target by means of at least two detecting means spaced apart from each other by the moving distance of the first terminal body to determine the rotating direction of the driving motor and for applying a drive signal having the determined rotating direction to the driving motor:

When the drive signal is applied to the driving control unit at Step (a), the driving control unit detects the positions of the first terminal body and the second terminal body by means of the detecting means. As shown in FIG. 6, the position detecting target C(62) is attached to the second terminal body 20. The position detecting target C(62) is detected by means of the at least two detecting means A(61) and B(61') attached to the first terminal body 10, by which the rotating direction of the motor is determined.

When it is detected that the second terminal body is exposed, the rotating direction of the motor is determined so that the first terminal body is slid in the direction of covering the second terminal body by means of the driving motor. The drive signal having the rotating direction determined as mentioned above is applied to the driving motor again. In the case that the second terminal body is covered, the drive signal is applied having the direction opposite to the above-mentioned rotating direction, i.e., the direction in which the first terminal body is opened.

Also, the detecting means A(61) and B(61') and the position detecting target C(62) may be contact or non-contact sensors as described above.

(c) Step for applying a drive-stop signal to the driving motor when one of the at least two detecting means detects the position detecting target within a prescribed period of time (s):

The drive signal having the determined rotating direction is applied to the driving motor after Step (b). As a result, the driving motor is operated, and the first terminal body is slid to the opening position or the closing position by means of the driving motor. When the position detecting target C(62) of the second terminal body 20 is detected by means of the detecting means other than the detecting means initially having contacted the position detecting target C(62), the operation of the motor is stopped.

The position detecting target C(62) of the second terminal body, which is at the initial closing position, contacts the detecting means A(61) of the first terminal body. When the first terminal body is moved to the opening position by means of the driving motor 40, the position detecting target C(62) of the second terminal body contacts the detecting means B(61') of the first terminal body. When the position detecting target C(62) is detected by means of the detecting means B(61'), a signal is transmitted to the driving control unit, which applies a drive-stop signal to the driving motor. At this time, it is required to detect the position within a prescribed period of time (s) by means of the detecting means other than the initial detecting means, which will be described in more detail below at the following step (d).

Preferably, the method of automatically driving the sliding-type mobile communication terminal according to the present invention further comprises the following step (d).

(d) Step for applying a drive signal having the direction opposite to the rotating direction to the driving motor when the position detecting target is not detected by means of the at least two detecting means for a prescribed period of time (s), and for performing Step (c) again:

As described above, the method of automatically driving the sliding-type mobile communication terminal according to the present invention comprises Steps (a) to (c). Preferably, the automatic driving method according to the present invention further comprises step (d). At Step (d), when the driving motor is operated, and the position of the position detecting target is not detected for a prescribed period of time (s), a drive signal having the direction opposite to the rotating direction is applied to the driving motor, and then Step (c) is performed.

The sliding-type mobile communication terminal may not be fully opened or closed when an external force is applied to the mobile communication terminal during the automatic opening/closing operation of the sliding-type mobile communication terminal. This is the case where a user stops the opening operation of the terminal body in order to close the terminal body during the opening operation of the terminal body. When an external load is applied to the sliding-type mobile communication terminal during the automatic operation, the sliding movement of the first terminal body is stopped. At this time, a maximum load is applied to the geared motor, a large amount of current flows, which corresponds to the starting current. Consequently, the consumption of the battery is increased.

When the position of the position detecting target is not detected by means of the detecting means for a prescribed period of time (s), it is determined that the movement of the first terminal body is interrupted by means of the above-mentioned external force, and therefore the rotating direction of the driving motor is reversed, by which the above-mentioned problem is solved. The prescribed period of time (s) is twice that of the opening/closing time. When the operating time at which the mobile communication terminal is moved from the closing position to the opening position is 0.5 seconds, the prescribed period of time (s) is 1 second. In this way, problems caused when an external force is applied to the mobile communication terminal during the automatic operation may be solved.

The automatic driving method will be described in the case of providing position detecting means for detecting the rotation of the hinge shaft 31 securely fixed to the shaft of the driving motor. The automatic driving method comprises the following steps.

FIG. 8 shows a mobile communication terminal with position detecting means for detecting the rotation of the hinge shaft.

(a) Step for Applying a Drive Signal to the Driving Control Unit:

First, an initial drive signal for moving the sliding-type mobile communication terminal to the opening or closing position is applied to the driving control unit. The drive signal may be generated by means of the operation of the opening/closing operation switch 12 attached to the first terminal body or the second terminal body. A button having different functions, which is attached to the side of the sliding-type mobile communication terminal, may be used instead of the switch 12.

(b) Step for detecting an initial position of the first terminal body 10 to determine the rotating direction of the driving motor 40 and for applying a drive signal having the determined rotating direction to the driving motor:

When the drive signal is applied to the driving control unit at Step (a), the driving control unit detects the position of the first terminal body by means of the detecting means.

Determination as to whether the first terminal body is opened or closed can be made by means of a circuit included in the mobile communication terminal. For example, the LCD may be turned on by means of the circuit when a user opens the upper terminal body, and the LCD may be turned off by means of the circuit when the user closes the upper terminal body. The detecting means may be the non-contact sensor or the contact sensor shown in FIG. 6. Another type of opening/closing detecting means may also be used.

Step (b), the position of the first terminal body is detected by means of the opening/closing detecting means so that the rotation direction of the driving motor is determined. When it is detected that the second terminal body is exposed, the rotating direction of the driving motor is determined so that the first terminal body is moved to the closing position by means of the driving motor. The drive signal having the above-mentioned determined rotating direction is applied to the driving motor again. In the case that the second terminal body is covered, the drive signal is applied having the direction opposite to the above-mentioned rotating direction, i.e., the direction in which the first terminal body is moved to the opening position.

(c) Step for applying a drive-stop signal to the driving motor when the prescribed number of in-phase signals is detected by means of the position detecting means for detecting the rotation of the hinge shaft 31:

The drive signal having the determined rotating direction is applied to the driving motor after Step (b). As a result, the driving motor is operated, and the first terminal body is slid to the opening position or the closing position by means of the driving motor. When the prescribed number of in-phase signals is detected by means of the position detecting means for detecting the rotation of the hinge shaft 31, as shown in FIG. 6, the driving control unit applies a drive-stop signal to the motor 40, by which the operation of the motor is stopped.

Here, the number of in-phase signals is predetermined by means of a rotating angle of the pinion for obtaining a desired stroke.

When the hinge shaft 31 is rotated by one revolution, the pinion 35 is moved on the rack while being rotated by one revolution (i.e., the moving distance of the first terminal body=D (diameter of the pinion)×π). Consequently, it is required to rotate the pinion by desired angles on the basis of the diameter of the pinion so that the first terminal body can be moved by a desired stroke. To this end, the number of the in-phase signals generated when the brush housing and the rectifying housing are electrically connected to each other is controlled by means of the driving control unit.

Therefore, in the case that a sensor for detecting an in-phase signal at every 360 degrees is used, and the closing or opening operation finishes as the pinion is rotated 360 degrees, the operation of the motor is stopped through the one-time detection of the in-phase signal.

Detecting the rotation of the hinge shaft to control the rotation of the motor on the basis of how many times the in-phase signals are generated may be identically carried out irrespective of whether the contact sensor or the non-contact sensor is used or where the hinge shaft is mounted.

(d) Step for automatically returning the first terminal body 10 to its original position when the second terminal body 20 is fully exposed or fully covered after the drive-stop signal is applied to the driving motor:

As described above, the method of automatically driving the sliding-type mobile communication terminal according to the present invention comprises Steps (a) to (c). Preferably, the automatic driving method according to the present invention further comprises Step (d).

When an external force is applied to the mobile communication terminal during the automatic opening/closing operation, the sliding movement of the first terminal body is interrupted, and thus the rotation of the pinion 35 is restricted.

As a result, the rotation of the slide cam 32 and the guide cam 34 engaged with the pinion is also restricted although the motor 40 is still rotated, and therefore the resilient means 33 is compressed. Consequently, the engagement of the hinge shaft 31 and the slide cam 32 is released, whereby a positional offset occurs.

When the prescribed number of the in-phase signals is detected, the operation of the motor is stopped. Since the reverse rotation of the motor is prevented by means of the gearbox, the slide cam is rotated by means of the restoring force of the resilient means. Consequently, the first terminal body is stably returned to its original position.

When the first terminal body is automatically sliding to the opening position, and the positional offset is below 180 degrees at the time when the operation of the motor is stopped, for example, the first terminal body 10 is returned to its original position, i.e., to the closing position, by means of the restoring force of the resilient means 33. When positional offset is below 180 degrees at the time when the operation of the motor is stopped, on the other hand, the first terminal body is moved to the opening position by means of the restoring force of the resilient means 33.

Consequently, the first terminal body of the sliding-type mobile communication terminal according to the present invention can be stably opened or closed even when an external force is applied to the first terminal body during the automatic sliding movement of the first terminal body.

The present invention also provides a method of detecting an incoming call to the automatic sliding-type mobile communication terminal in addition to the method of automatically driving the sliding-type mobile communication terminal comprising the above-mentioned steps. Mobile communication parts are mounted in the sliding-type mobile communication terminal including the first terminal body and the second terminal body, which are slid relative to each other by means of the driving motor so that the second terminal body is exposed or covered. The sliding-type mobile communication terminal further includes the position detecting means for directly detecting the relative position between the first terminal body and the second terminal body (the full opening position or the full closing position) to recognize the completion of the sliding movement, as shown in FIG. 6.

Figure 12:
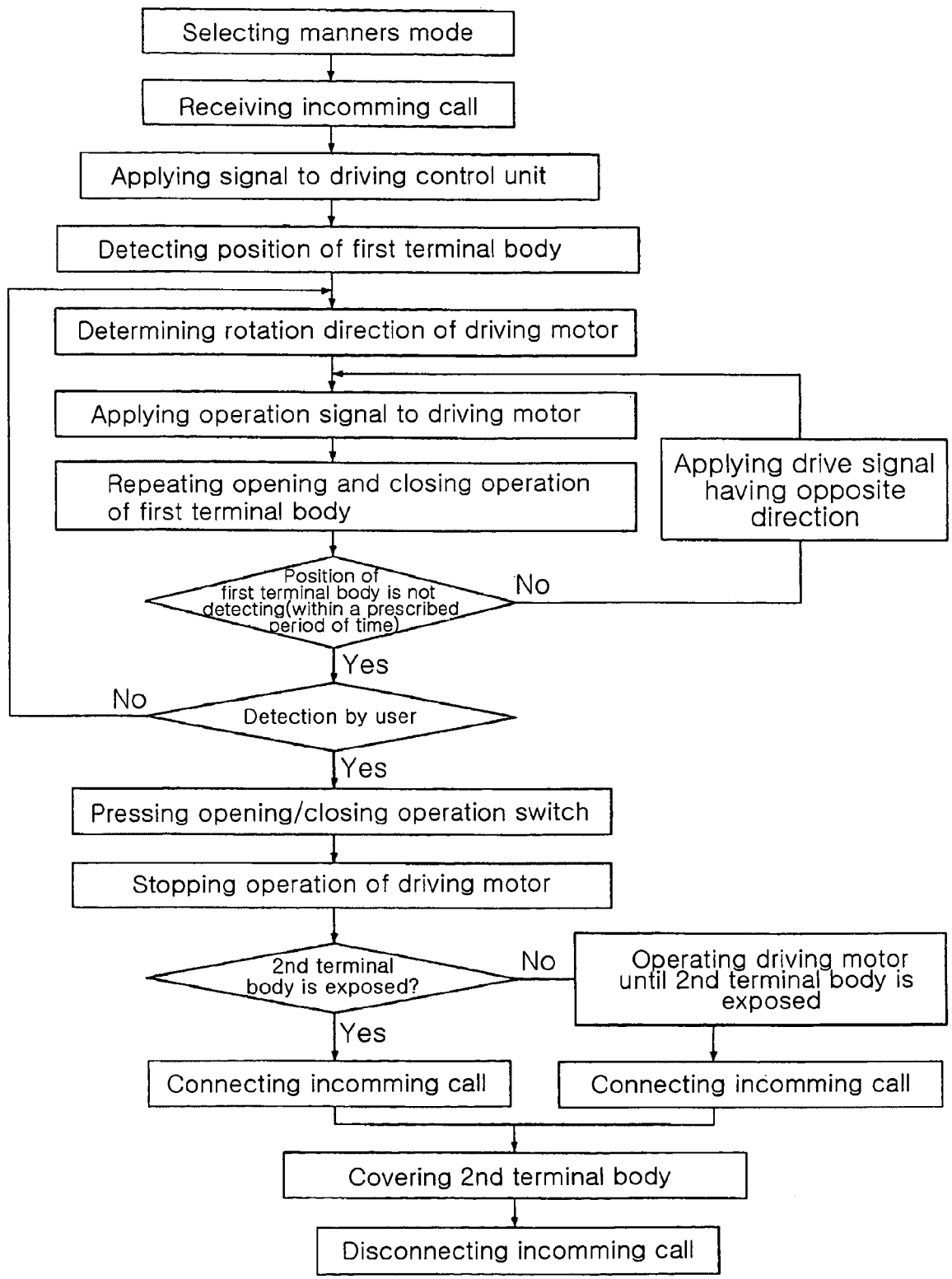
FIG. 12 is a flowchart showing a method of detecting an incoming call to an automatic sliding-type mobile communication terminal.

The incoming call detecting method according to the present invention comprises the following steps. FIG. 12 is a flowchart showing a method of detecting an incoming call to an automatic sliding-type mobile communication terminal.

(a) Step for Receiving an Incoming Call From the Outside:

An incoming call is received from the outside. The incoming call is transmitted to a main control unit of the mobile communication terminal via an antenna of the mobile communication terminal. The main control unit may be a small computing part, such as a microcomputer.

(b) Step for applying an incoming call detection signal to the driving control unit of the sliding-type mobile communication terminal when the incoming call is detected:

When the incoming call is detected by means of the main control unit (not shown), the incoming call detection signal is applied to the driving control unit (not shown). The driving control unit serves to supply current to the driving motor or stop the supply of the current to the driving motor. The driving control unit, which is connected to the position detecting means, receives a signal from the position detecting means for controlling the operation of the driving motor.

(c) Step for determining an initial rotation direction of the driving motor by means of the driving control unit depending upon whether the second terminal body is exposed or covered:

When the incoming call detection signal is applied to the driving control unit as mentioned above, the initial rotating direction of the driving motor is determined by means of the driving control unit depending upon whether the second terminal body is exposed or covered. Preferably, it may be detected by means of the position detecting target and detecting means whether the second terminal body is exposed or covered.

As shown in FIG. 6, the position detecting target C(62) is attached to the second terminal body. The position detecting target C(62) is detected by means of the at least two detecting means A(61) and B(61') attached to the first terminal body 10, by which the rotating direction of the motor is determined.

When it is detected that the second terminal body is exposed, the rotating direction of the driving motor is determined so that the first terminal body is slid in the direction of covering the second terminal body by means of the driving motor. The drive signal having the rotating direction determined as mentioned above is applied to the driving motor again. In the case that the second terminal body is covered, the drive signal is applied having the direction opposite to the above-mentioned rotating direction, i.e., the direction in which the first terminal body is opened.

Also, the detecting means A(61) and B(61') and the position detecting target C(62) may be contact or non-contact sensors as described above.

(d) Step for applying an operation signal to the driving motor of the sliding-type mobile communication terminal by means of the driving control unit so that the second terminal body can be repeatedly exposed and covered:

An operation signal is applied to the driving motor of the sliding-type mobile communication terminal so that the driving motor is rotated in the driving direction determined at Step (c). The first terminal body is moved in the direction of exposing the second terminal body or in the direction of covering the second terminal body, which is repeatedly carried out.

When an incoming call is received, the opening and closing operation of the first terminal body is repeatedly carried out, by which a user can detect the incoming call to the sliding-type mobile communication terminal.

Preferably, Step (d) comprises the following sub-steps, which are repeatedly carried out.

(d1) Step for applying an operation signal to the driving motor of the sliding-type mobile communication terminal by means of the driving control unit:

The operation signal having the rotating direction determined at Step (c) is applied to the driving motor of the sliding-type mobile communication terminal. The driving motor 40 of FIG. 3 or 4 is operated by means of the driving control unit.

(d2) Step for applying a drive signal having the Direction Opposite to the Rotating direction to the driving control unit when the position detecting target is detected by means of one of the at least two detecting means within a prescribed period of time (s):

When the drive signal having the determined rotating direction is applied to the driving motor at Step (d1), the driving motor is operated. As the driving motor is operated, the first terminal body is moved to the opening or closing position. When the position detecting target of the second terminal body 20 is detected by means of the detecting means other than the detecting means initially having contacted the position detecting target, a drive signal having the rotating direction opposite to the initial rotating direction is applied to the driving control unit.

Specifically, the position detecting target C(62) of the second terminal body, which is covered, is in contact with the detecting means A(61) of the first terminal body. When the first terminal body is moved to the opening direction by means of the driving motor 40, the position detecting target C(62) contacts the detecting means B(61') of the first terminal body. The detecting means B(61'), detecting the position detecting target C(62), transmits a signal to the driving control unit. The driving control unit applies a drive signal having the opposite rotating direction to the driving motor. At this time, it is required to detect the position of the position detecting target by means of the detecting means other than the initial detecting means within a prescribed period of time (s).

As described above, Step (d) is carried out through the repetition of Steps (d1) and (d2).

More preferably, Step (d) further comprises the following sub-step, Step (d3). Consequently, Step (d) is carried out through the repetition of Step (d3) as well as Steps (d1) and (d2).

(d3) Step for applying a drive signal having the direction opposite to the rotating direction to the driving control unit when the position of the position detecting target is not detected by means of the at least two detecting means for a prescribed period of time (s):

As describe above, the method of automatically driving the sliding-type mobile communication terminal according to the present invention comprises the above-mentioned steps. Preferably, the automatic driving method further comprises Step (d3). At Step (d3), when the driving motor is operated, and the position of the position detecting target is not detected for a prescribed period of time (s), a drive signal having the direction opposite to the rotating direction is applied to the driving control unit.

The sliding-type mobile communication terminal may not be fully opened or closed when an external force is applied to the mobile communication terminal during the automatic opening/closing operation of the sliding-type mobile communication terminal. This is the case where a user stops the opening operation of the terminal body in order to close the terminal body during the opening operation of the terminal body. When an external load is applied to the sliding-type mobile communication terminal during the automatic operation, the sliding movement of the first terminal body is stopped. At this time, a maximum load is applied to the geared motor, a large amount of current flows, which corresponds to the starting current. Consequently, the consumption of the battery is increased.

When the position of the position detecting target is not detected by means of the detecting means for a prescribed period of time (s), it is determined that the movement of the first terminal body is interrupted by means of the above-mentioned external force, and therefore the rotating direction of the driving motor is reversed, by which the above-mentioned problem is solved. The prescribed period of time (s) is twice that of the opening/closing time. When the operating time at which the mobile communication terminal is moved from the closing position to the opening position is 0.5 seconds, for example, the prescribed period of time (s) is 1 second. In this way, problems caused when an external force is applied to the mobile communication terminal during the repeated automatic operation may be solved.

Step (d) is performed through the repetition of Steps (d1), (d2) and (d3).

Preferably, the incoming call detecting method according to the present invention further comprises the following steps, Step (e) and Step (f).

e. Step for Stopping the Opening and Closing Operation of the First Terminal Body by Means of the Opening/closing Operation Switch:

When a user detects that the opening and closing operation of the first terminal body is repeatedly carried out as described above, the user presses the opening/closing operation switch 12 so that the operation of the driving motor of the sliding-type mobile communication terminal is stopped. The opening/closing operation switch 12 may be a common auto-folder operation key or any key on the mobile communication terminal. When the user presses the opening/closing operation switch 12, the repeated opening and closing operation of the first terminal body by means of the auto-folder is stopped, and then the following incoming call connection step is carried out.

(f) Step for operating the driving motor of the sliding-type mobile communication terminal until the second terminal body is fully exposed when the second terminal body is covered after it is detected whether the second terminal body is exposed or covered:

After the user presses the opening/closing operation switch as mentioned above so that the operation of the driving motor of the auto-folder is stopped, the opening operation of the first terminal body may be carried out once more depending upon whether the second terminal body is exposed or covered. In the case that the second terminal body is exposed when the opening/closing operation switch is pressed, the incoming call is directly connected. In this case, the conversation is possible without pressing a "send" button or performing any other action. In the case that the second terminal body is covered when the opening/closing operation switch is pressed, on the other hand, the incoming call cannot be directly connected. In this case, it is required to operate the driving motor of the auto-folder until the second terminal body is fully exposed. When the second terminal body is fully exposed, the operation of the driving motor is stopped, and at the same time the incoming call is directly connected.

The method of detecting the incoming call to the automatic sliding-type mobile communication terminal according to the present invention is accomplished by performing the above-mentioned steps.

The incoming call detecting method is carried out especially when a manners mode, i.e., a silent mode is selected. The incoming call detecting method according to the present invention may be substituted for the conventional method of detecting an incoming call signal with the vibration motor.

As apparent from the above description, the present invention provides an automatic sliding-type mobile communication terminal comprising a motor, a pair of engaging members, which are selectively engageable with each other, and position detecting means, whereby the terminal can be automatically opened and closed with ease.

The automatic sliding-type mobile communication terminal according to the present invention further comprises resilient means, whereby the terminal body can be more smoothly opened or closed, and the terminal can be returned to its original position even when the automatic sliding-type mobile communication terminal is operated in a manual mode.

According to the present invention, the opening and closing operation of the automatic sliding-type mobile communication terminal can be automatically completed even when the terminal is not fully opened or closed due to an external force applied to the terminal.

Furthermore, an incoming call to the automatic sliding-type mobile communication terminal can be detected by means of the movement of the terminal instead of using a vibration motor, whereby an incoming call detecting efficiency is improved. Since the incoming call to the automatic sliding-type mobile communication terminal can be detected by means of the movement of the terminal instead of using the vibration motor, the incoming call can be detected tactually and visually. Moreover, the present invention requires no vibration motor, whereby the automatic sliding-type mobile communication terminal can be miniaturized and the manufacturing cost of automatic sliding-type mobile communication terminal can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sliding-type mobile communication terminal having a first terminal body and a second terminal body, the first terminal body and the second terminal body being slid relative to each other while one of the first terminal body and the second terminal body is laid on the top of the other, wherein the terminal comprises:
   a motor for providing power necessary for a sliding movement;
   a power transmission unit connected to a rotary shaft of the motor for transmitting a driving force of the motor, the power transmission unit including a pair of engaging members, resilient means for selectively engaging the engaging members with each other and a guide cam for receiving the resilient means and one of the engaging members;
   a pinion connected to the power transmission unit and rotated by means of the driving force of the motor;
   the first terminal body having a rack attached thereto, the rack being engaged with the pinion, the first terminal body being slid relative to the second terminal body when the pinion is rotated;
   the second terminal body having the power transmission unit and the pinion, the motor being securely fixed to the second terminal body;
   an opening/closing operation switch disposed in the first terminal body or the second terminal body for applying an operation signal to the motor; and
   a control unit for controlling the operation of the motor in response to the signal of the opening/closing operation switch;
   wherein the pair of engaging members comprise: a hinge shaft having one side fixed to the rotary shaft of the motor; and a slide cam selectively engageable with the hinge shaft, wherein the guide cam relatively locks the slide cam in the rotating direction and movably accommodates the slide cam in the axial direction, the guide cam having one end engaged with the pinion, and wherein the resilient means is disposed between the slide cam and the guide cam for pressing the slide cam against the hinge shaft.

2. The terminal as set forth in claim 1, wherein the motor is a geared motor with a gearbox for amplifying a driving torque.

3. The terminal as set forth in claim 1, wherein the resilient means has a resilient force larger than the driving force of the motor and smaller than an external force, the resilient means is expanded in response to an automatic sliding movement so that the slide cam is rotated as engaged with the hinge shaft, and the resilient means is compressed in response to a manual sliding movement by means of the external force so that the engagement of the hinge shaft with the slide cam is released.

4. The terminal as set forth in claim 3, wherein the resilient means is a compression coil spring.

5. The terminal as set forth in claim 1, wherein the hinge shaft has a protrusion formed thereon so that the hinge shaft serves as a male cam, and the slide cam has a depression, corresponding to the protrusion of the male cam, formed at one side thereof so that the slide cam serves as a female cam.

6. The terminal as set forth in claim 1, wherein the slide cam has a protrusion formed thereon so that the slide cam serves as a male cam, and the hinge shaft has a depression, corresponding to the protrusion of the male cam, formed at one side thereof so that the hinge shaft serves as a female cam.

7. The terminal as set forth in claim 1, wherein the opening/closing operation switch is a button with different functions.

8. The terminal as set forth in claim 1, wherein the second terminal body includes a housing for accommodating the power transmission unit, the motor being securely fixed to the housing, wherein the housing is securely fixed to the second terminal body.

9. The terminal as set forth in claims 1, further comprising: a sensor unit having position detecting means for controlling the sliding movement of the first terminal body, wherein the driving control unit controls the operation of the motor in response to the signal from the position detecting means.

10. The terminal as set forth in claim 5, wherein the female cam and the male cam are engaged with each other at every 360 degrees.

11. The terminal as set forth in claim 9, wherein the position detecting means of the sensor unit is attached to at least one of the first and second terminal bodies for directly detecting the relative position between the first terminal body and the second terminal body to recognize the completion of the sliding movement.

12. The terminal as set forth in claim 9, wherein the position detecting means of the sensor unit is attached to the first and second terminal bodies for directly detecting the relative position between the first terminal body and the second terminal body to recognize the completion of the sliding movement.

13. The terminal as set forth in claim 12, wherein the position detecting means is a contact sensor switchable when one of at least two detecting means contacts a position detecting target, the completion of the sliding movement of the first terminal body being detected by the switching of the sensor.

14. The terminal as set forth in claim 13, wherein the contact sensor comprises:
    switch terminals attached to the upper and lower ends of the first terminal body or the upper and lower ends of the second terminal body, respectively, the switch terminals being switchable by means of depression; and
    a contact terminal formed in the shape of a fine protrusion and attached to the upper end of the second terminal body or the lower end of the first terminal body, the contact terminal corresponding to the switch terminals, the contact terminal pressing the switch terminals when the sliding movement of the first terminal body is completed so that the switch terminals are switched.

15. The terminal as set forth in claim 12, wherein the position detecting means is a non-contact sensor switchable when one of the at least two detecting means is opposite to the position detecting target without contact, the completion of the sliding movement of the first terminal body being detected by the switching of the sensor.

16. The terminal as set forth in claim 15, wherein the non-contact sensor comprises:
    detecting sensors attached to the upper and lower ends of the first terminal body or the upper and lower ends of the second terminal body, respectively, the switch terminals being switchable when a magnetic field is detected; and
    a magnet attached to the upper end of the second terminal body or the lower end of the first terminal body for generating a magnetic field, the magnet corresponding to the detecting sensors, the magnet being opposite to the detecting sensors when the sliding movement of the first terminal body is completed so that the detecting sensors are switched.

17. The terminal as set forth in claim 9, wherein the position detecting means of the sensor unit detects the rotation of a prescribed part of the hinge shaft at a prescribed angle from the motor securely fixed to the second terminal body.

18. The terminal as set forth in claim 17, wherein the position detecting means is a contact sensor for detecting, by contact, the rotation of the prescribed part of the hinge shaft at a prescribed angle.

19. The terminal as set forth in claim 18, wherein the contact sensor comprises:
    a brush housing having a protruded brush formed thereon; and
    a rectifying housing having a first pattern and a second pattern formed thereon while the first and second patterns are spaced apart from each other so that the first and second patterns are electrically connected to each other at every desired angles through electrical contact of the brush and the first and second patterns, and
    wherein an in-phase state is detected when the first pattern and the second pattern of the rectifying housing are electrically connected to each other at every desired angles via the brush of the brush housing as the brush housing and the rectifying housing are rotated relative to each other by the rotation of the motor.

20. The terminal as set forth in claim 19, wherein the brush housing is securely fixed to the output side of the motor or one side of the hinge shaft, and the rectifying housing is securely fixed to one side of the hinge shaft or the output side of the motor, the rectifying housing being opposite to the brush housing.

21. The terminal as set forth in claim 19, wherein the rectifying housing is securely fixed to the circumference of the hinge shaft or the inside of the housing, and the brush housing is securely fixed to the inside of the housing or the circumference of the hinge shaft, the brush housing being opposite to the rectifying housing.

22. The terminal as set forth in claim 17, wherein the position detecting means is a non-contact sensor for detecting, without contact, the rotation of the prescribed part of the hinge shaft at a prescribed angle.

23. The terminal as set forth in claim 22, wherein the non-contact sensor comprises:
    sensors switchable when a magnetic field is detected; and
    a magnet disposed corresponding to the sensors for generating a magnetic field.

24. The terminal as set forth in claim 9, wherein the sensor unit comprises:
    position detecting means for detecting the completion of the sliding movement of the first terminal body; and
    position detecting means for detecting the rotation of a prescribed part of the hinge shaft at a prescribed angle from the motor securely fixed to the second terminal body.

* * * * *